US009776153B2

(12) United States Patent
Kelly et al.

(10) Patent No.: US 9,776,153 B2
(45) Date of Patent: *Oct. 3, 2017

(54) CERAMIC OXYGEN TRANSPORT MEMBRANE ARRAY REACTOR AND REFORMING METHOD

(71) Applicants: Sean M. Kelly, Pittsford, NY (US); Gervase Maxwell Christie, Amherst, NY (US); Charles Robinson, Lawtons, NY (US); Jamie R. Wilson, Maynard, MA (US); Javier E. Gonzalez, East Amherst, NY (US); Uttam R. Doraswami, Tonawanda, NY (US)

(72) Inventors: Sean M. Kelly, Pittsford, NY (US); Gervase Maxwell Christie, Amherst, NY (US); Charles Robinson, Lawtons, NY (US); Jamie R. Wilson, Maynard, MA (US); Javier E. Gonzalez, East Amherst, NY (US); Uttam R. Doraswami, Tonawanda, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 546 days.

This patent is subject to a terminal disclaimer.

(21) Appl. No.: 14/508,326

(22) Filed: Oct. 7, 2014

(65) Prior Publication Data
US 2015/0096506 A1 Apr. 9, 2015

Related U.S. Application Data

(60) Provisional application No. 61/887,751, filed on Oct. 7, 2013, provisional application No. 61/932,974, filed
(Continued)

(51) Int. Cl.
*B01J 7/00* (2006.01)
*B01J 8/00* (2006.01)
(Continued)

(52) U.S. Cl.
CPC ............... *B01J 8/009* (2013.01); *B01J 8/065* (2013.01); *B01J 8/067* (2013.01); *B01J 12/007* (2013.01);
(Continued)

(58) Field of Classification Search
CPC .................................................. C01B 13/0251
See application file for complete search history.

(56) References Cited

U.S. PATENT DOCUMENTS 2,593,507 A 4/1952 Wainer
2,692,760 A 10/1954 Flurschutz
(Continued)

FOREIGN PATENT DOCUMENTS

DE 10330859 A1 2/2004
DE 102004038435 A1 2/2006
(Continued)

OTHER PUBLICATIONS

Lee Rosen, Nick Degenstein; Minish Shah; Jamie Wilson; Sean Kelly; John Peck; and Max Christie; "Development of Oxygen Transport Membranes for Coal-Based Power Generation"; ScienceDirect (Available online at www.sciencedirect.com); Energy Procedia 4 (2011) pp. 750-755.
(Continued)

*Primary Examiner* — Imran Akram
(74) *Attorney, Agent, or Firm* — Ralph J. Mancini

(57) ABSTRACT

The invention relates to a commercially viable modular ceramic oxygen transport membrane system for utilizing heat generated in reactively-driven oxygen transport membrane tubes to generate steam, heat process fluid and/or provide energy to carry out endothermic chemical reactions. The system provides for improved thermal coupling of oxygen transport membrane tubes to steam generation tubes
(Continued)

or process heater tubes or reactor tubes for efficient and effective radiant heat transfer.

19 Claims, 20 Drawing Sheets

Related U.S. Application Data on Jan. 29, 2014, provisional application No. 61/985,838, filed on Apr. 29, 2014.

(51) Int. Cl.
*F22B 1/00* (2006.01)
*F22B 1/16* (2006.01)
*B01J 8/06* (2006.01)
*B01J 12/00* (2006.01)
*B01J 19/24* (2006.01)
*C01B 3/38* (2006.01)
*C01B 13/02* (2006.01)

(52) U.S. Cl.
CPC ........... *B01J 19/242* (2013.01); *B01J 19/243* (2013.01); *B01J 19/2425* (2013.01); *B01J 19/2475* (2013.01); *C01B 3/382* (2013.01); *C01B 3/384* (2013.01); *C01B 13/0255* (2013.01); *F22B 1/003* (2013.01); *F22B 1/16* (2013.01); *B01J 2208/00309* (2013.01); *B01J 2208/00938* (2013.01); *B01J 2219/0004* (2013.01); *B01J 2219/00006* (2013.01); *B01J 2219/0006* (2013.01); *B01J 2219/00117* (2013.01); *C01B 2203/0233* (2013.01); *C01B 2203/0244* (2013.01); *C01B 2203/0894* (2013.01); *C01B 2203/127* (2013.01); *Y02P 20/129* (2015.11)

(56) References Cited

U.S. PATENT DOCUMENTS

| | | | |
|---|---|---|---|
| 3,282,803 A | 11/1966 | Poepel et al. |
| 3,317,298 A | 5/1967 | Klomp et al. |
| 3,468,647 A | 9/1969 | Buyers et al. |
| 3,770,621 A | 11/1973 | Collins et al. |
| 3,861,723 A | 1/1975 | Kunz et al. |
| 3,868,817 A | 3/1975 | Marion et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Bonaquist et al. |
| 4,153,426 A | 5/1979 | Wintrell |
| 4,162,993 A | 7/1979 | Retalick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retalick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retalick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| 6,191,573 B1 | 2/2001 | Noda |
| RE37,134 E | 4/2001 | Wilson |
| 6,214,066 B1 | 4/2001 | Nataraj et al. |
| 6,268,075 B1 | 7/2001 | Autenrieth et al. |
| 6,290,757 B1 | 9/2001 | Lawless |
| 6,293,084 B1 | 9/2001 | Drnevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,355,093 B1 | 3/2002 | Schwartz et al. |
| 6,360,524 B1 | 3/2002 | Drnevich et al. |
| 6,368,491 B1 | 4/2002 | Cao et al. |
| 6,382,958 B1 | 5/2002 | Bool, III et al. |
| 6,394,043 B1 | 5/2002 | Bool, III et al. |
| 6,402,156 B1 | 6/2002 | Schutz et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |

(56) References Cited

U.S. PATENT DOCUMENTS

| | | |
|---|---|---|
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Repasky et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,795,417 B2 | 8/2014 | Christie et al. |
| 8,894,944 B2 | 11/2014 | Larsen et al. |
| 9,023,245 B2 | 5/2015 | Chakravarti et al. |
| 9,115,045 B2 | 8/2015 | Chakravarti et al. |
| 9,212,113 B2 | 12/2015 | Chakravarti et al. |
| 9,296,671 B2 | 3/2016 | Stuckert et al. |
| 9,365,466 B2 | 6/2016 | Chakravarti et al. |
| 9,452,401 B2 | 9/2016 | Kelly et al. |
| 9,453,644 B2 | 9/2016 | Kromer et al. |
| 2002/0073938 A1 | 6/2002 | Bool et al. |
| 2002/0078906 A1 | 6/2002 | Prasad et al. |
| 2002/0141920 A1 | 10/2002 | Alvin et al. |
| 2002/0155061 A1* | 10/2002 | Prasad .................. C01B 3/382 423/652 |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0135324 A1 | 7/2004 | Brule et al. |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0019827 A1 | 1/2006 | Whittenberger |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0063659 A1 | 3/2006 | Xue et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0122667 A1 | 5/2007 | Kelley |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0245897 A1 | 10/2007 | Besecker et al. |
| 2007/0289215 A1 | 12/2007 | Hemmings et al. |
| 2007/0292342 A1 | 12/2007 | Hemmings et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0142148 A1 | 6/2008 | Nielsen et al. |
| 2008/0168901 A1 | 7/2008 | Carolan et al. |
| 2008/0169449 A1* | 7/2008 | Mundschau ......... B01D 69/141 252/373 |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0018373 A1 | 1/2009 | Werth et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1 | 9/2009 | Osada |
| 2009/0272266 A1 | 11/2009 | Werth et al. |
| 2010/0015014 A1 | 1/2010 | Gopalan et al. |
| 2010/0018394 A1 | 1/2010 | Ekiner et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0203238 A1 | 8/2010 | Magno et al. |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0020192 A1 | 1/2011 | Baumann et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |

(56) References Cited

U.S. PATENT DOCUMENTS

| | | |
|---|---|---|
| 2012/0067210 A1 | 3/2012 | Sane et al. |
| 2012/0288439 A1 | 11/2012 | Sundaram et al. |
| 2012/0294783 A1 | 11/2012 | Palamara et al. |
| 2013/0009100 A1 | 1/2013 | Kelly et al. |
| 2013/0009102 A1 | 1/2013 | Kelly |
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2013/0258000 A1 | 10/2013 | Ohashi et al. |
| 2014/0044604 A1 | 2/2014 | Lane et al. |
| 2014/0056774 A1 | 2/2014 | Kelly et al. |
| 2014/0060643 A1 | 3/2014 | Martin et al. |
| 2014/0183866 A1 | 7/2014 | Kromer et al. |
| 2014/0206779 A1 | 7/2014 | Lackner |
| 2014/0231351 A1 | 8/2014 | Wickramasinghe et al. |
| 2014/0319424 A1 | 10/2014 | Chakravarti et al. |
| 2014/0319427 A1 | 10/2014 | Chakravarti et al. |
| 2014/0323597 A1 | 10/2014 | Stuckert et al. |
| 2014/0323598 A1 | 10/2014 | Chakravarti et al. |
| 2014/0323599 A1 | 10/2014 | Chakravarti et al. |
| 2015/0096506 A1 | 4/2015 | Kelly et al. |
| 2015/0098872 A1 | 4/2015 | Kelly et al. |
| 2015/0226118 A1 | 8/2015 | Kelly et al. |
| 2016/0001221 A1 | 1/2016 | Lu et al. |
| 2016/0118188 A1 | 4/2016 | Wada |
| 2016/0155570 A1 | 6/2016 | Shimada et al. |

FOREIGN PATENT DOCUMENTS

| | | |
|---|---|---|
| EP | 0 663 231 A2 | 7/1995 |
| EP | 0 926 096 A1 | 6/1999 |
| EP | 0 984 500 A2 | 3/2000 |
| EP | 0 989 093 A2 | 3/2000 |
| EP | 1 504 811 A1 | 2/2005 |
| EP | 1717420 A1 | 11/2006 |
| EP | 1743694 A1 | 1/2007 |
| EP | 2 098 491 A1 | 9/2009 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1 312 700 | 4/1973 |
| GB | 1348375 | 3/1974 |
| JP | 56-136605 | 10/1981 |
| WO | WO 97/41060 | 11/1997 |
| WO | WO 2011/020192 A1 | 11/1997 |
| WO | WO 9842636 | 10/1998 |
| WO | WO 0017418 | 3/2000 |
| WO | WO 0109059 A1 | 2/2001 |
| WO | WO 2004/063110 A2 | 7/2004 |
| WO | WO 2006/064160 A1 | 6/2006 |
| WO | WO 2007060141 | 5/2007 |
| WO | WO 2007/092844 A2 | 8/2007 |
| WO | WO 2007086949 | 8/2007 |
| WO | WO 2008024405 | 2/2008 |
| WO | WO 2009/027099 A1 | 3/2009 |
| WO | WO 2010052641 A2 | 5/2010 |
| WO | WO 2011083333 A1 | 7/2011 |
| WO | WO 2011121095 A2 | 10/2011 |
| WO | WO 2012118730 | 9/2012 |
| WO | WO 2013009560 A1 | 1/2013 |
| WO | WO 2013/062413 A1 | 5/2013 |
| WO | WO 2013089895 A1 | 6/2013 |
| WO | WO 2014/049119 A1 | 4/2014 |
| WO | WO 2014074559 A1 | 5/2014 |
| WO | WO 2014077531 A1 | 5/2014 |
| WO | WO 2014/107707 A2 | 7/2014 |
| WO | WO 2014/160948 A1 | 10/2014 |
| WO | WO 2014/176022 A1 | 10/2014 |

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with CO2 Recovery", Final Report (Feb. 2002).

The U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a CO2 Recovery Power Plant by Burning Pulverized Coal in O2/CO2, Energy Conyers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

Jian-jun Liu, Tong Liu, Wen-dong Wang, Jian-feng Gao, Chu-sheng Chen; Zr0.84Y0.16O1.92-La0.8Sr0.2Cr0.5Fe0.5O3-8 dual-phase composite hollow fiber membrane targeting chemical reactor applications; Journal of Membrane Science 389 (2012) 435-440.

(56) References Cited

OTHER PUBLICATIONS

M. Solvang, K.A. Nielsen, and P.H. Larsen, "Optimization of Glass Ceramic Sealant for Intermediate Temperature Solid Oxide Fuel Cells", Jan. 1, 2005, XP055352985, Retrieved from the Internet: URL:http://ma.ecsdl.org/content/MA2005-01/30/1206.full.pdf on Mar. 8, 2017.
VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/Data_Sheet_VDM_Crofer_22_APU.pdf retrieved on Mar. 9, 2017.
Friedemann Marschner et al., "Gas Production", Ullmann's Encyclopedia of Industrial Chemistry, Jun. 15, 2000, pp. 1-21, XP002253967.

\* cited by examiner

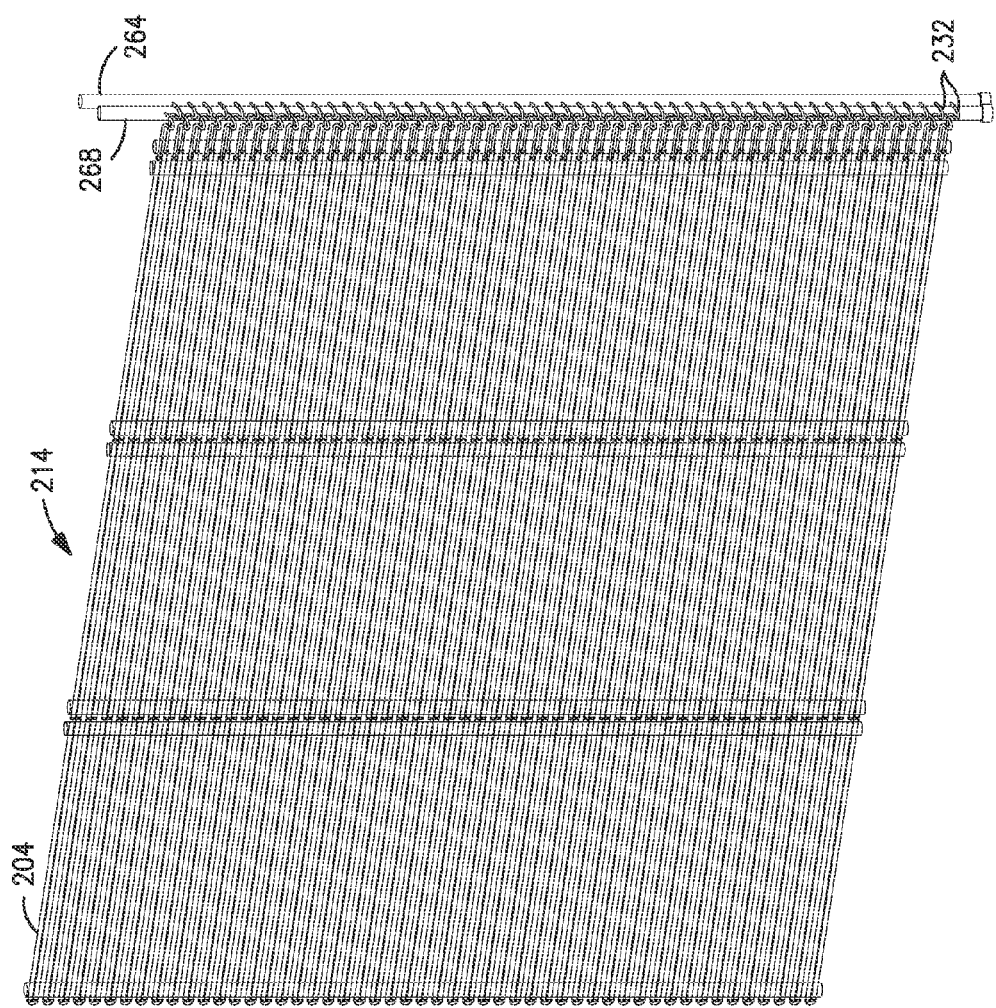

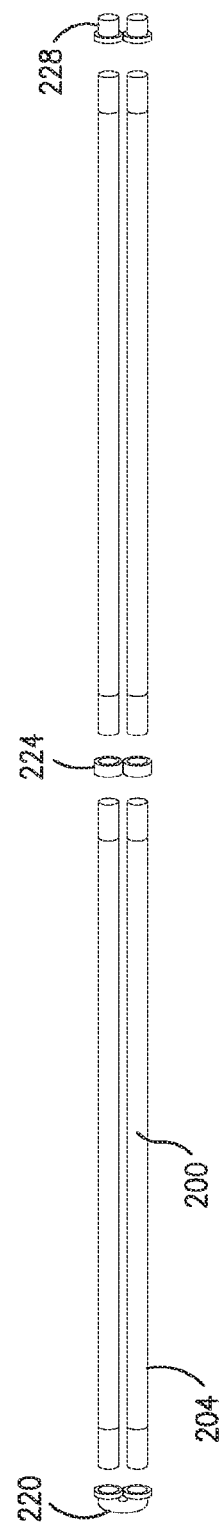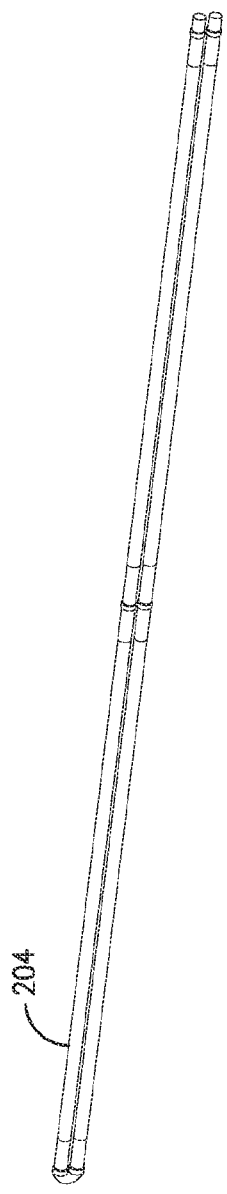
FIG. 6A
FIG. 6B

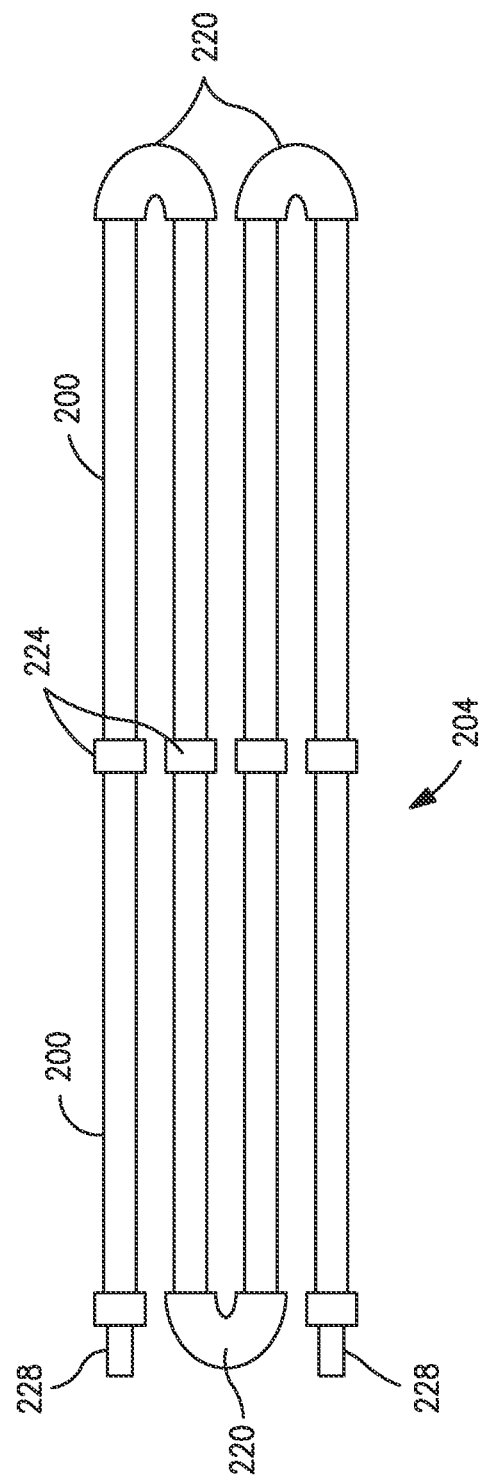

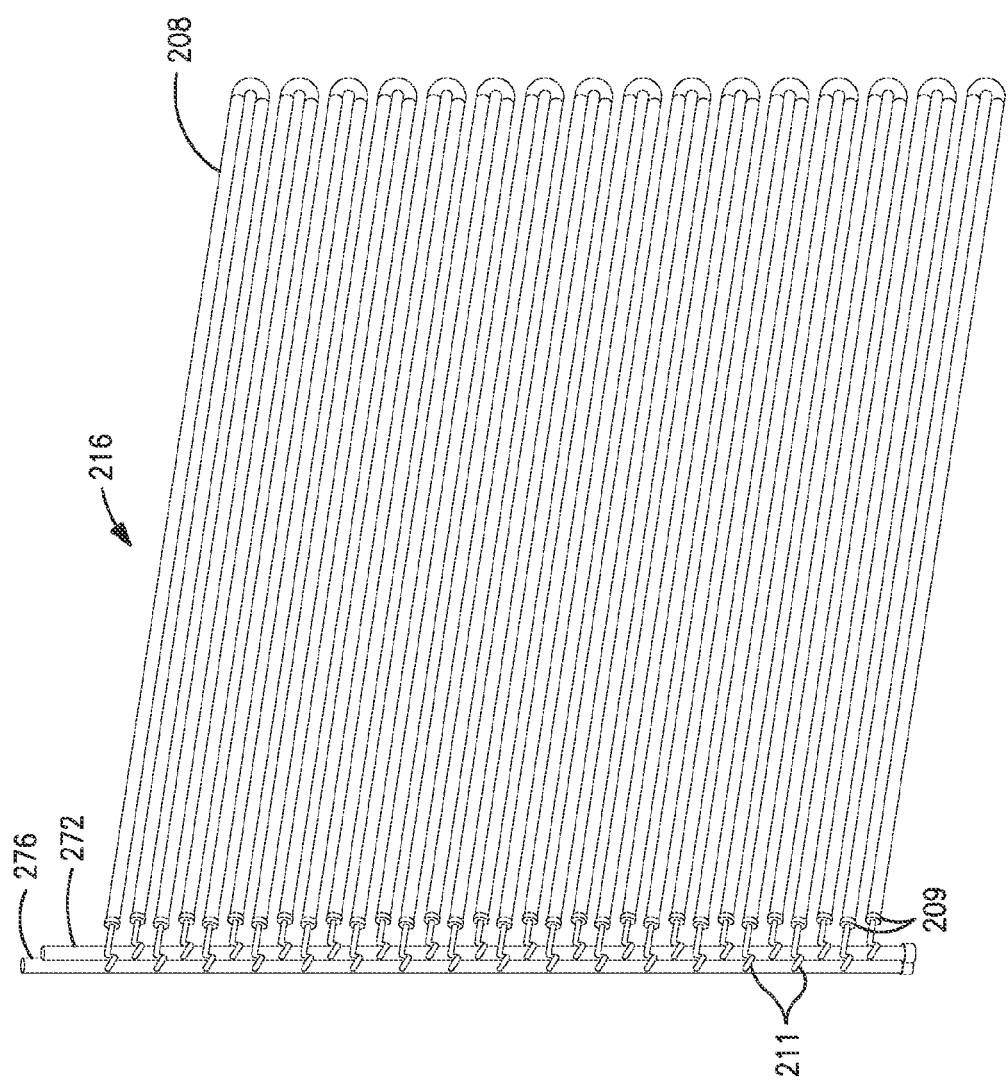

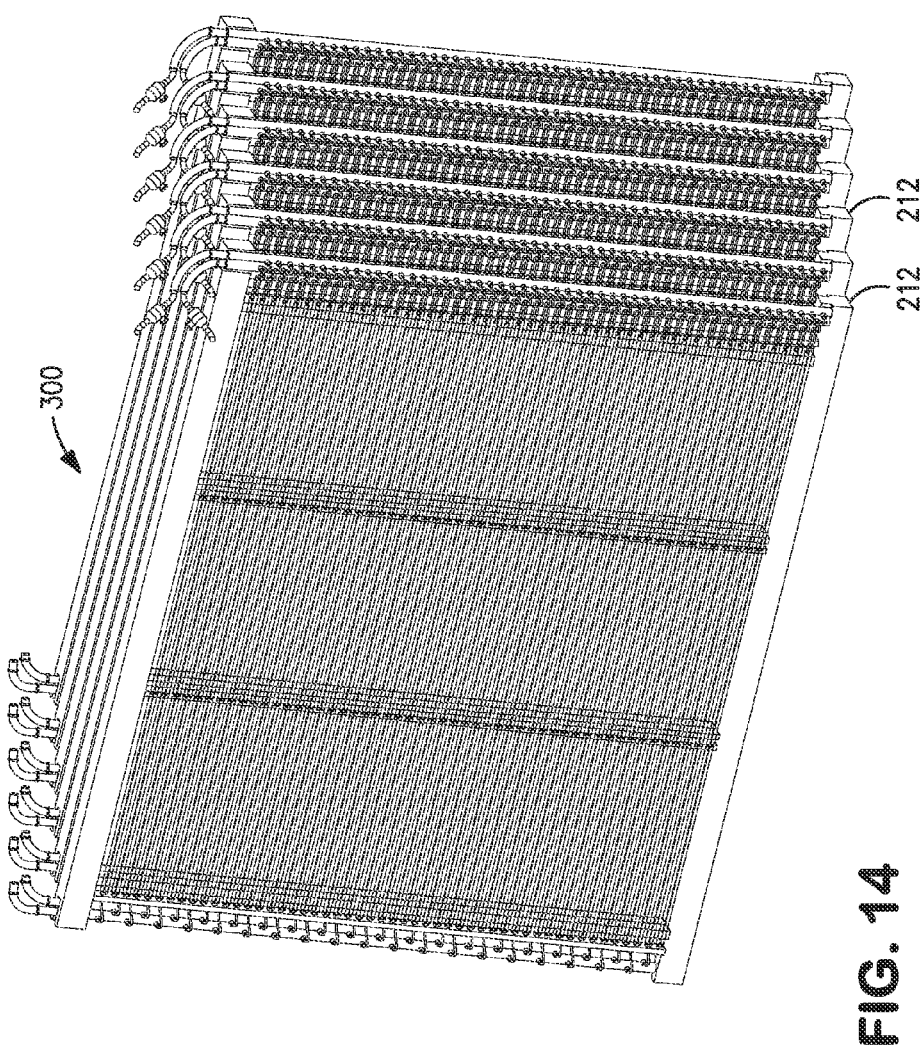

US 9,776,153 B2

CERAMIC OXYGEN TRANSPORT MEMBRANE ARRAY REACTOR AND REFORMING METHOD

CROSS REFERENCE TO RELATED APPLICATIONS

This application claims the benefit of and priority to U.S. Provisional Patent Application Ser. Nos. 61/887,751, filed Oct. 7, 2013; 61/932,974, filed Jan. 29, 2014; and 61/985,838, filed Apr. 29, 2014, the disclosures of which are incorporated by reference herein.

STATEMENT OF GOVERNMENT RIGHTS

This invention was made with Government support under Cooperative Agreement No. DE-FC26-07NT43088, awarded by the United States Department of Energy. The Government has certain rights in this invention.

FIELD OF THE INVENTION

The present invention provides a method and apparatus for producing a synthesis gas from a hydrocarbon containing gaseous feed introduced into an oxygen transport membrane based reforming reactor comprised of an array of ceramic oxygen transport membrane tubes and catalyst containing reforming tubes. More particularly, the present invention provides a modular based oxygen transport membrane based reforming reactor that has a high degree of thermal coupling and packing density to optimize the synthesis gas production per unit volume of the reactor.

BACKGROUND OF THE INVENTION

Synthesis gas containing hydrogen and carbon monoxide is produced for a variety of industrial applications, for example, the production of hydrogen, chemicals and synthetic fuel production. Conventionally, the synthesis gas is produced in a fired reformer in which natural gas and steam is reformed in nickel catalyst containing reformer tubes at high temperatures (900 to 1,000° C.) and moderate pressures (16 to 20 bar) to produce the synthesis gas. The endothermic heating requirements for steam methane reforming reactions occurring within the reformer tubes are provided by burners firing into the furnace that are fueled by part of the natural gas. In order to increase the hydrogen content of the synthesis gas produced by the steam methane reforming (SMR) process, the synthesis gas can be subjected to water-gas shift reactions to react residual steam in the synthesis gas with the carbon monoxide.

A well-established alternative to steam methane reforming is the partial oxidation process (POx) whereby a limited amount of oxygen is allowed to burn with the natural gas feed creating steam and carbon dioxide at high temperatures and the high temperature steam and carbon dioxide are subjected to subsequent reforming reactions.

A key shortcoming of both the SMR and POx processes is the significant amount of carbon emitted to the atmosphere as carbon dioxide gas in the low-pressure flue gas. In addition, producing synthesis gas by conventional SMR or POx processes are recognized to be a relatively expensive processes.

An attractive alternative process for producing synthesis gas is an oxygen-fired autothermal reformer (ATR) process that uses oxygen to partially oxidize natural gas internally in a reactor which retains nearly all the carbon in the high pressure synthesis gas, thus facilitating removal of carbon dioxide for carbon capture. However, the ATR process requires a separate air separation unit (ASU) to produce high purity, high-pressure oxygen, which adds complexity as well as capital and operating cost to the overall process.

As can be appreciated, the conventional methods of producing a synthesis gas such as SMR, POx or ATR systems are expensive and require complex installations. In order to overcome the complexity and expense of such installations it has been proposed to generate the synthesis gas within reactors that utilize an oxygen transport membrane to supply oxygen and thereby generate the heat necessary to support endothermic heating requirements of the steam methane reforming reactions. A typical oxygen transport membrane has a dense layer that, while being impervious to air or other oxygen containing gas, will transport oxygen ions when subjected to an elevated operational temperature and a difference in oxygen partial pressure across the membrane.

Examples of oxygen transport membrane based reforming reactors used in the production of synthesis gas can be found in U.S. Pat. Nos. 6,048,472; 6,110,979; 6,114,400; 6,296,686; 7,261,751; 8,262,755; and 8,419,827. The problem with all of these oxygen transport membrane based systems is that because such oxygen transport membranes need to operate at high temperatures of around 900° C. to 1100° C., preheating of the hydrocarbon feed to similarly high temperatures is often required. Where hydrocarbons such as methane and higher order hydrocarbons are subjected to such high temperatures, excessive carbon formation will occur in the feed stream, especially at high pressures and low steam to carbon ratios. The carbon formation problems are particularly severe in the above-identified prior art oxygen transport membrane based systems. A different approach to using an oxygen transport membrane based reforming reactor in the production of synthesis gas is disclosed in U.S. Pat. No. 8,349,214 and United States Patent Application Serial No. 2013/0009102 both of which disclose a reactively driven oxygen transport membrane based reforming system that uses hydrogen and carbon monoxide as part of the reactant gas feed which address many of the highlighted problems with the earlier oxygen transport membrane systems. Other problems that arise with the prior art oxygen transport membrane based reforming systems are the cost and complexity of the oxygen transport membrane modules and the lower than desired thermal coupling, durability, reliability and operating availability of such oxygen transport membrane based reforming systems. These problems are the primary reasons that oxygen transport membranes based reforming systems have not been successfully commercialized. Recent advances in oxygen transport membrane materials have addressed problems associated with oxygen flux, membrane degradation and creep life, but there is much work left to be done to achieve commercially viable oxygen transport membrane based reforming systems from a cost standpoint as well as from an operating reliability and availability standpoint.

Process designs that utilize thermally coupled separate oxygen transport membrane and catalytic reforming reactors have their own set of challenges. For example, oxygen transport membranes may be configured to perform several tasks such as separation of oxygen from air, reaction of permeated oxygen with a reactant stream to produce a water vapor containing reactant stream required to support endothermic reactions in the catalytic reforming reactor and transferring heat to drive the endothermic reactions in the catalytic reforming reactor to achieve desired production of synthesis gas. Heat to support endothermic reactions within catalytic reactors is mostly provided by radiant heat transfer of the heat released from combustion of permeated oxygen in the oxygen transport membrane reactor. At elevated temperatures the oxygen transport membranes are subjected to considerable mechanical stresses both during normal steady-state operation and transient operations such as start-up, shutdown, as well as, upset conditions, particularly at detrimental levels when temperatures or rate of temperature change may be outside acceptable ranges. Thus, inefficient transfer of exothermic heat released in the oxygen transport membrane reactors to the catalytic reforming reactors will lead to less efficient operation, higher capital cost and more complex system.

The need, therefore, continues to exist for a synthesis gas generation system that has a high degree of thermal integration efficiency, higher heat transfer surface areas, and high packing density to optimize the synthesis gas production per unit volume of the reactor. The present invention addresses the aforementioned problems by providing a commercially viable modular ceramic oxygen transport membrane assembly that improves the maintainability and manufacturability of the synthesis gas production system and, more importantly, improves the thermal coupling of the reactively-driven oxygen transport membrane tubes and catalyst reforming tubes required to efficiently and effectively produce synthesis gas.

SUMMARY OF THE INVENTION

The present invention in one or more aspects can be characterized as an oxygen transport membrane panel for transferring radiant heat to a plurality of catalytic reforming reactors, the oxygen transport membrane panel comprising a panel frame or support structure and a plurality of oxygen transport membrane repeating units within or attached to the panel frame wherein the oxygen transport membrane repeating units are arranged in a tightly packed linear or co-planar orientation. Each oxygen transport membrane repeating unit comprises two or more oxygen transport membrane tubes coupled together at one end to form a multi-pass arrangement and the other end of the tubes configured to be in fluid communication with either a feed manifold or an exhaust manifold. In addition, each oxygen transport membrane tube has a permeate side located on an interior surface of the tube and a retentate side located on an exterior surface of the tube.

The oxygen transport membrane panels are configured to separate oxygen from an oxygen containing stream contacting the retentate side of the tubes in cross-flow arrangement and react the permeated oxygen with a gas stream containing hydrogen and carbon containing species introduced into the permeate side of the tubes thereby producing radiant heat and a steam containing reaction product stream. The catalytic reforming reactors placed in a juxtaposed relationship, and more preferably a parallel or substantially parallel orientation, with respect to the oxygen transport membranes. The catalytic reforming reactors are configured to produce synthesis gas from in the presence of the radiant heat and a hydrocarbon containing reactant stream containing the reaction product stream from the oxygen transport membrane panels. The view factor between the oxygen transport membrane panels radiating heat to the catalytic reforming reactors is preferably greater than or equal to about 0.4 whereas the surface area ratio between the catalytic reforming reactors and the oxygen transport membrane panels radiating heat to the catalytic reforming reactors is from about 0.4 to about 1.0, in another embodiment from about 0.5 to about 1.0.

The present invention may also be characterized as a catalytic reforming panel for producing synthesis gas from a hydrocarbon containing reactant feed stream in the presence of radiant heat and steam received from a plurality of reactively driven oxygen transport membrane elements. In this regard, the catalytic reforming panels comprise a panel frame or support structure and a plurality of reforming repeating units within or attached to the panel frame or support structure and wherein the reforming repeating units are arranged in a tightly packed linear or co-planar orientation. Each reforming repeating unit contains at least one multi-pass reforming tube in fluid communication with a feed manifold or an exhaust manifold and each multi-pass reforming tube contains steam reforming catalysts configured to produce the synthesis gas from the hydrocarbon containing reactant feed stream in the presence of the radiant heat and steam. The catalytic reforming panels are preferably placed in a juxtaposed relationship, and more preferably a parallel or substantially parallel orientation, with respect to the oxygen transport membrane elements with a view factor between the oxygen transport membrane elements radiating heat to the catalytic reforming panels greater than or equal to about 0.4. In one embodiment, the surface area ratio between the catalytic reforming panels and the oxygen transport membrane elements radiating heat to the catalytic reforming reactors is from about 0.5 to about 1.0.

The present invention may also be characterized as an oxygen transport membrane array module comprising; (i) a frame or support structure; (ii) one or more oxygen transport membrane panels orientated within and/or attached to the frame, each panel comprising a plurality of oxygen transport membrane repeating units arranged in a tightly packed linear or co-planar orientation wherein each oxygen transport membrane repeating unit contains two or more oxygen transport membrane tubes coupled together at one end to form a multi-pass arrangement and the other end of the tubes configured to be in fluid communication with a first feed manifold or a first exhaust manifold; and (iii) one or more catalytic reforming panels orientated within and/or attached to the frame in a juxtaposed orientation with respect to the one or more the oxygen transport membrane panels, each catalytic reforming panel comprising a plurality of reforming repeating units arranged in a tightly packed linear or co-planar orientation wherein each reforming repeating unit comprises at least one multi-pass reforming tube in fluid communication with a second feed manifold or a second exhaust manifold. The catalytic reforming panels are arranged in a plane parallel or substantially parallel to the oxygen transport membrane panels. Each multi-pass reforming tube contains steam reforming catalysts configured to produce a synthesis gas from a hydrocarbon containing reactant feed stream in the presence of the radiant heat and steam produced by the oxygen transport membrane tubes.

Finally, the present invention may also be characterized as an oxygen transport membrane isolation valve assembly comprising: (i) a housing fluidically coupled to an end of an oxygen transport membrane tube, the housing having an inlet end, an opposing discharge end, and defining a flow path therebetween wherein a portion of the housing proximate to one of the ends is configured as a chamfered seat; (ii) a restraining pin or structure disposed in the housing apart from the chamfered seat and projecting into the flow path; (iii) a ceramic ball disposed in the flow path of the housing between the chamfered seat and the restraining pin or structure and configured to rest against the restraining pin or structure and allow gas flow through the flow path during normal operation of the oxygen transport membrane tube and to seat against the chamfered seat and cut-off gas flow in the flow path upon a failure of the oxygen transport membrane.

In one embodiment of the oxygen transport membrane isolation valve assembly, the chamfered seat is disposed proximate the outlet end of the housing and configured to cut off a feed stream to the oxygen transport membrane. In another embodiment of the oxygen transport membrane isolation valve assembly, the chamfered seat is disposed proximate the inlet end of the housing and configured to cut off an exit path from the oxygen transport membrane and prevent backflow into the oxygen transport membrane from the exit manifold.

Alternatively, the present invention may also be characterized an oxygen transport membrane panel for transferring radiant heat to a plurality of steam generating reactors or gas heating reactors, the oxygen transport membrane panel comprising: (i) a panel frame or support structure; and (ii) a plurality of oxygen transport membrane repeating units orientated within and/or attached to the panel frame and wherein the oxygen transport membrane repeating units are arranged in a tightly packed linear or co-planar orientation. Each oxygen transport membrane repeating unit comprises two or more oxygen transport membrane tubes coupled together at one end to form a multi-pass arrangement and the other end of the tubes configured to be in fluid communication with either a feed manifold or an exhaust manifold.

In addition, each oxygen transport membrane tube having a permeate side located on an interior surface of the tube and a retentate side located on an exterior surface of the oxygen transport membrane tube. The plurality of oxygen transport membrane panels are configured to separate oxygen from an oxygen containing stream contacting the retentate side of the oxygen transport membrane tubes in cross-flow arrangement and react the permeated oxygen with a gas stream containing hydrogen fuel or hydrocarbon fuel introduced into the permeate side of the oxygen transport membrane tubes thereby producing radiant heat and a reaction product stream. In the embodiment incorporating a plurality of steam generating reactors, the steam generating reactors are configured to produce steam from a source of feed water in the presence of the radiant heat from the oxygen transport membrane panels; wherein the plurality of steam generating reactors comprise a feed water manifold, a steam exhaust manifold, and a plurality of steam tubes disposed in a juxtaposed orientation with respect to the one or more the oxygen transport membrane tubes and the plurality of steam tubes in fluid communication with the feed water manifold and the steam collection or exhaust manifold.

BRIEF DESCRIPTION OF THE DRAWINGS

The above and other aspects, features, and advantages of the present invention will be more apparent from the following, more detailed description thereof, presented in conjunction with the following drawings, in which:

FIG. 5 is a schematic illustration of an oxygen transport membrane panel;

FIGS. 6A, 6B and 7 are schematic illustrations of two configurations of oxygen transport membrane repeating units;

FIG. 8 is a schematic illustration of a catalytic reforming panel and FIG. 9 is a schematic illustration of a catalytic reforming repeating unit;

FIG. 12A is a schematic illustration of oxygen transport membrane isolation valve arrangement, while

FIG. 14 is a schematic illustration of stacked dual panel modules;

DETAILED DESCRIPTION

Reactively Driven Oxygen Transport Membrane Based Reforming System

Broadly speaking, the present invention may be characterized as an improved oxygen transport membrane based reforming reactor for producing synthesis gas. The improved reactor and system provides enhanced thermal coupling of oxygen transport membrane tubes and catalytic containing reforming tubes as well as improved manufacturability, maintainability and operability compared to previously disclosed oxygen transport membrane based reforming systems and reactors.

Figure 1:
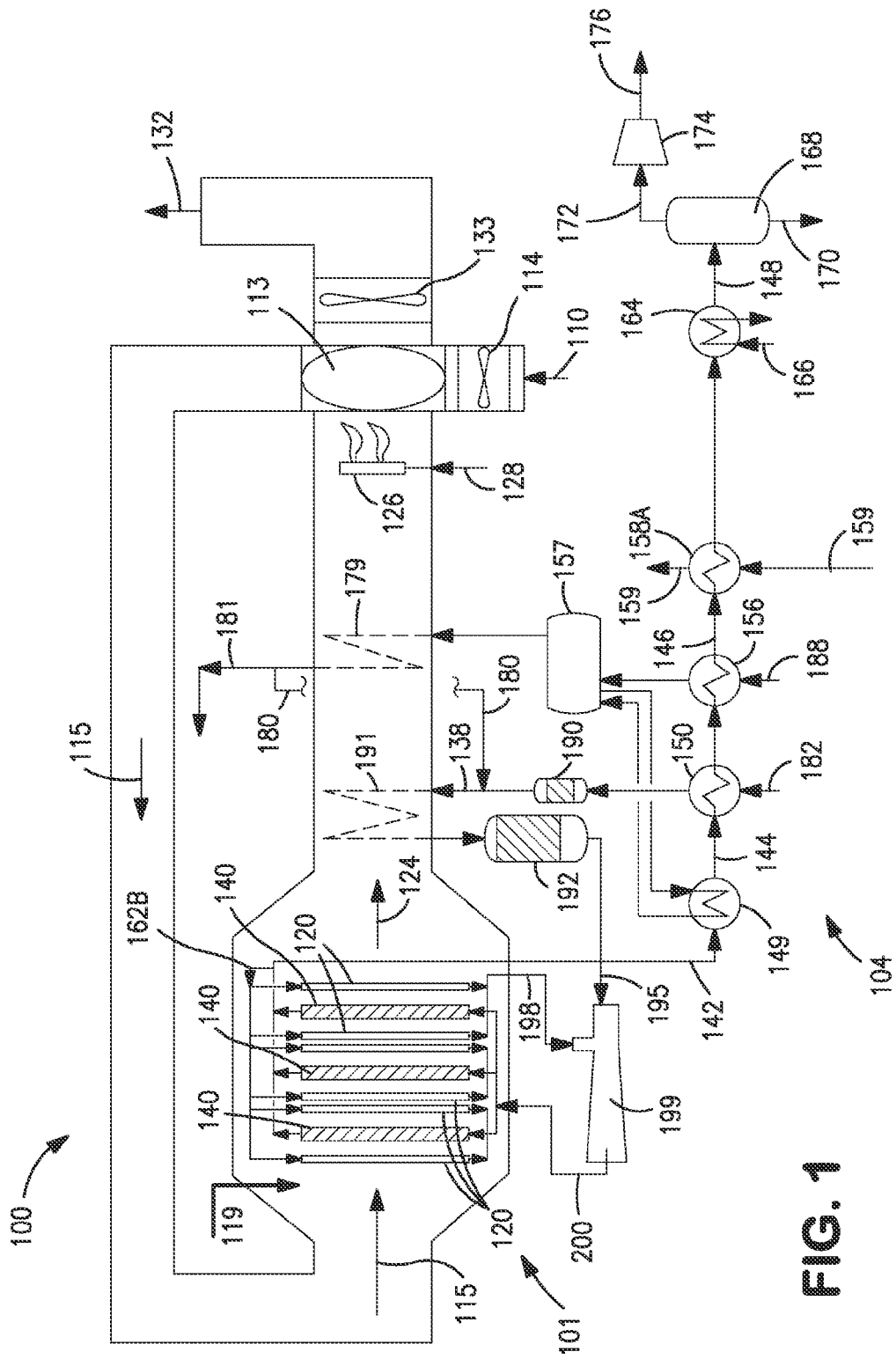
FIGS. 1 and 2 show schematic illustrations of a synthesis gas production system and underlying oxygen transport membrane technology.
Figure 2:
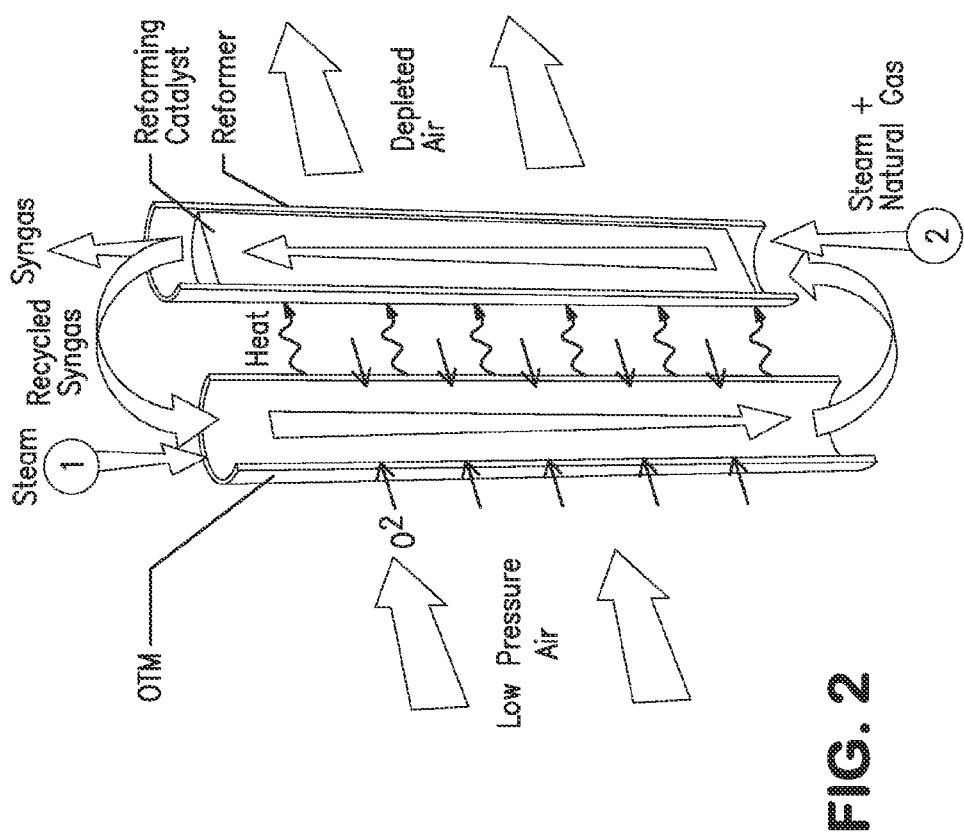

For purposes of describing the general operation of the reactively driven oxygen transport membrane based reforming reactor and system, FIG. 1 and FIG. 2 show schematic illustrations of the system and underlying oxygen transport membrane technology. As seen therein, an oxygen containing stream 110, such as air, is introduced to the system 100 by means of a blower or fan 114 into a heat exchanger 113 for purposes of preheating the oxygen containing stream 110. Heat exchanger 113 is preferably a high efficiency, cyclic or continuously rotating regenerator disposed in operative association with the oxygen containing stream 110 and the heated retentate stream 124. The heated and oxygen depleted retentate stream 124 can optionally be introduced into a duct burner region containing duct burner 126 and used to support combustion of a supplemental fuel stream 128 to produce supplemental heat introduced into the continuously rotating regenerator 113 to preheat the oxygen containing stream 110. Alternatively, the duct burner may also be disposed directly in the duct leaving heat exchanger 113 to pre-heat the oxygen containing stream 110. Exhaust stream 132 from heat exchanger 113 is discharged.

The heated oxygen containing stream 115 is then directed via the intake duct to the oxygen transport membrane elements 120 incorporated into the oxygen transport membrane reactor 101. Each of the oxygen transport membrane elements 120 are preferably configured as a multilayered ceramic tube capable of conducting oxygen ions at an elevated operational temperature, wherein the retentate side of the oxygen transport membrane elements 120 is the exterior surface of the ceramic tubes exposed to the oxygen containing stream and the permeate side is the interior surface of the ceramic tubes. Although only six oxygen transport membrane elements 120 are illustrated in close proximity to three catalytic reforming tubes 140, as would occur to those skilled in the art, there could be many of such oxygen transport membrane elements and many catalytic reforming tubes in each oxygen transport membrane assembly. Likewise, there would be multiple oxygen transport membrane assemblies used in an industrial application of the oxygen transport membrane based reforming reactor 101.

A hydrogen containing stream is also introduced into the permeate side of the oxygen transport membrane elements 120 and is oxidized though reaction with the permeated oxygen to produce a reaction product stream 198 and heat. In one optional embodiment the hydrogen containing stream is a recycled portion of the produced synthesis gas 163. As a result of separation of oxygen and the reaction (i.e. combustion) occurring at the permeate side of oxygen transport membrane elements 120, a heated, oxygen depleted retentate stream 124 is also formed.

As described in more detail below, the hydrogen containing stream is preferably a portion of the heated synthesis gas stream exiting the catalyst reforming tubes. A portion of heated synthesis gas, preferably from about 25% to about 50%, is recycled to the permeate side of the oxygen transport membrane tubes 120 to react with the oxygen permeate stream to generate the heated reaction product stream and radiant heat. In one embodiment the temperature of the hot synthesis recycled gas is above 1500° F. so as to avoid problems associated with metal dusting corrosion.

The hot synthesis gas stream 162 is driven or pulled to the permeate side of the oxygen transport membrane tubes or elements 120 by means of an ejector, eductor or venturi based device 199 operatively coupled to the permeate side of the oxygen transport membrane elements 120. By suctioning the streams at the permeate side of the oxygen transport membrane elements 120 into the ejector, eductor or venturi based device 199 with a motive fluid comprising the pre-reformed reformer feed stream 195, the reaction product stream 198 mixes with the pre-reformed reformer feed stream 195 to produce the combined feed stream 200, preferably having a steam to carbon ratio of from about 1.6 to about 3.0 and a temperature of from about 1000° F. to about 1400° F. Essentially, device 199 moves the lower pressure hot synthesis gas recycle stream 162 to the higher pressure combined feed stream 200.

The reaction of the hydrogen containing stream or recycled synthesis gas stream 163 at the permeate side of the oxygen transport membrane element 120 produces heat. Radiation of this heat together with the convective heat transfer provided by heated retentate stream 124 heats the catalytic reactor tubes 140 to supply the endothermic heating requirements of the steam methane reforming occurring in catalytic reactor tubes 140. As the heated retentate stream 124 exits the oxygen transport membrane based reforming reactor 101, it also heats a reformer feed stream 138 to a temperature of from about 900° F. to about 1200° F. via indirect heat transfer using one or more coils 191 disposed in the retentate duct such that the oxygen depleted retentate stream 124 heats the feed streams passing through the coils 191. Also note that any superheated steam not added or used in the natural gas feed 182 may be exported steam 181 that can be used for power generation.

The hydrocarbon containing feed stream 182 to be reformed is preferably natural gas. Depending on the supply pressure, the natural gas is compressed or let down to the desired pressure via a compressor or valve arrangement (not shown) and then preheated in heat exchanger 150 that serves as a fuel preheater. Also, since the natural gas typically contains unacceptably high level of sulfur species, the natural gas feed stream 182 undergoes a sulfur removal process such as hydrotreating, via device 190, to reduce the sulfur species to $H_2S$, which is subsequently removed in a guard bed using material like ZnO and/or CuO. The hydrotreating step also saturates any alkenes present in the hydrocarbon containing feed stream. Further, since natural gas generally contains higher hydrocarbons that will break down at high temperatures to form unwanted carbon deposits that adversely impact the reforming process, the natural gas feed stream 182 is preferably pre-reformed in an adiabatic pre-reformer 192, which converts higher hydrocarbons to methane, hydrogen, carbon monoxide, and carbon dioxide. Pre-reformers are typically catalyst-based systems. Although not shown, this pre-reformed reformer feed stream 195 may be further heated via indirect heat exchange with the heated retentate stream 124. Also contemplated, but not shown, is an embodiment where the pre-reformer may comprise a heated pre-reformer that is thermally coupled with the heated retentate stream 124 or heated oxygen containing stream 115 downstream of the duct burner.

In the illustrated system, the above-described heated reaction product stream 198 is combined with the heated pre-reformed reformer feed stream 195 to produce a combined feed stream 200 that contains steam and hydrocarbons. This combined feed stream is introduced into the catalytic reactor tubes 140 where the combined feed stream 200 is subjected to steam methane reforming to produce a synthesis gas stream 142. The temperature of the combined feed stream 200 is from about 1000° F. to about 1400° F., and in another embodiment from about 1100° F. to about 1400° F. Steam 180 may also be added to the combined feed stream 200, the natural gas feed stream 182, or the preheated pre-reformed reformer feed stream 195, as required, to adjust the temperature of stream 200 as well as the steam to carbon ratio of stream 200 to from about 1.6 to about 3.0, and more preferably to steam to carbon ratio from about 2.0 to about 2.8. The steam is preferably superheated steam 180 from about 300 psia to about 1200 psia and from about 600° F. to about 1100° F. and heated by means of indirect heat exchange with the heated retentate stream 124 using steam coils 179 disposed in the retentate duct. The superheated steam 180 is preferably added to the hydrocarbon containing feed stream 182 upstream of the pre-reformer 192 to adjust the steam to carbon ratio and final temperature of the combined feed stream 200. Also, to reduce the methane slip and optimize the economic performance of the oxygen transport membrane based reforming reactor, the oxygen transport membrane reactor 101 should preferably be maintained at an exit pressure of less than or equal to about 250 psia, and more preferably at an exit pressure of less than or equal to 150 psia.

The synthesis gas stream 142 produced by the oxygen transport membrane based reforming reactor 101 generally contains hydrogen, carbon monoxide, steam and carbon dioxide other constituents such as possible methane slip. Heat exchange section 104 is designed to cool the produced synthesis gas stream 142. The heat exchange section 104 is also designed such that in cooling the synthesis gas stream 142, various feed streams are preheated and process steam is also generated.

The initial cooling of synthesis gas stream 142 is accomplished with steam generation in a process gas boiler (PG boiler) 149 coupled to steam drum 157 and designed to reduce the temperature of the cooled synthesis gas 144 to about 760° F. or less. As illustrated in FIG. 1, the initially cooled synthesis gas stream 144 is successively further cooled in a heat exchange network that includes hydrocarbon feed preheater 150, economizer 156, feed water heaters 158, synthesis gas cooler 161 and water cooled heat exchanger 164.

The initially cooled synthesis gas stream 144 is directed to the fuel preheater 150 to heat the natural gas feed stream 182 and then is directed to the economizer 156 to heat boiler feed water 188. The boiler feed water stream 188 is preferably pumped using a feed water pump (not shown), heated in economizer 156 and sent to steam drum 157.

The cooled synthesis gas stream 146 is further cooled in a series of steps including a feed water heater 158, used to heat feed water stream 159, followed by a synthesis gas cooler 161 and a subsequent water cooled heat exchanger 164 cooled via a separate cooling water stream 166. The heated feed water 159 is directed to a de-aerator (not shown) that provides boiler feed water 188. The resulting fully cooled synthesis gas stream 148 is then introduced into a knock-out drum 168 from which a condensate stream 170 is drained to produce a fully cooled synthesis gas stream 172. The fully cooled synthesis gas stream 172 may be compressed in a synthesis gas compressor 174 to produce a synthesis gas product 176.

In some applications of the reactively driven oxygen transport membrane based reforming reactor and system, the produced synthesis gas should have a module of from about 1.5 to about 2.2. In addition, such produced synthesis gas stream ideally has a methane slip of less than about 4.5 percent by volume where the exit pressure of the oxygen transport membrane based reforming reactor is 250 psia or less, and more preferably, a methane slip of less than about 2.5 percent by volume where the exit pressure of the oxygen transport membrane based reforming reactor is 170 psia or less.

Figure 3:
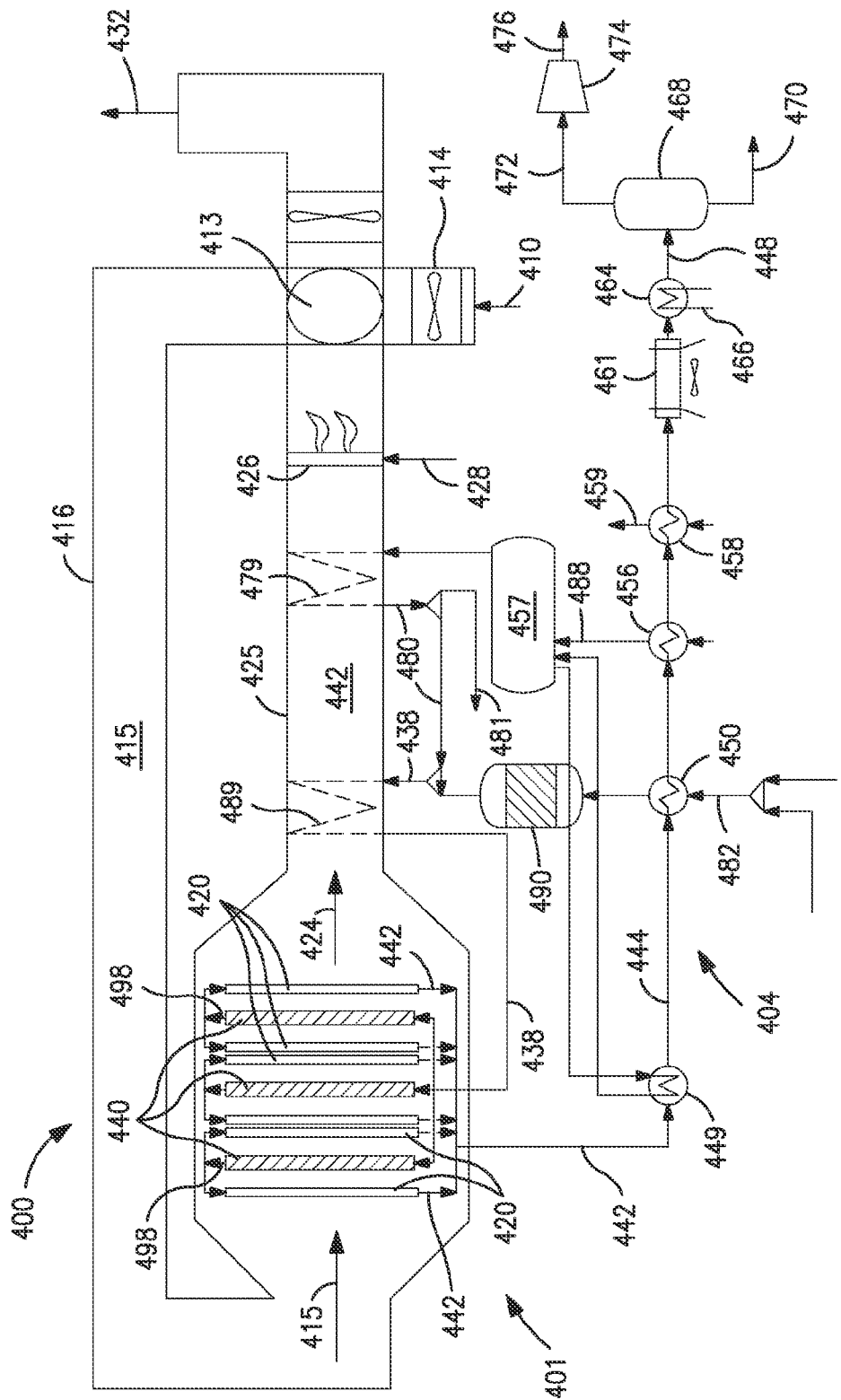
FIGS. 3 and 4 show schematic illustrations of an alternate synthesis gas production system and underlying oxygen transport membrane technology.
Figure 4:
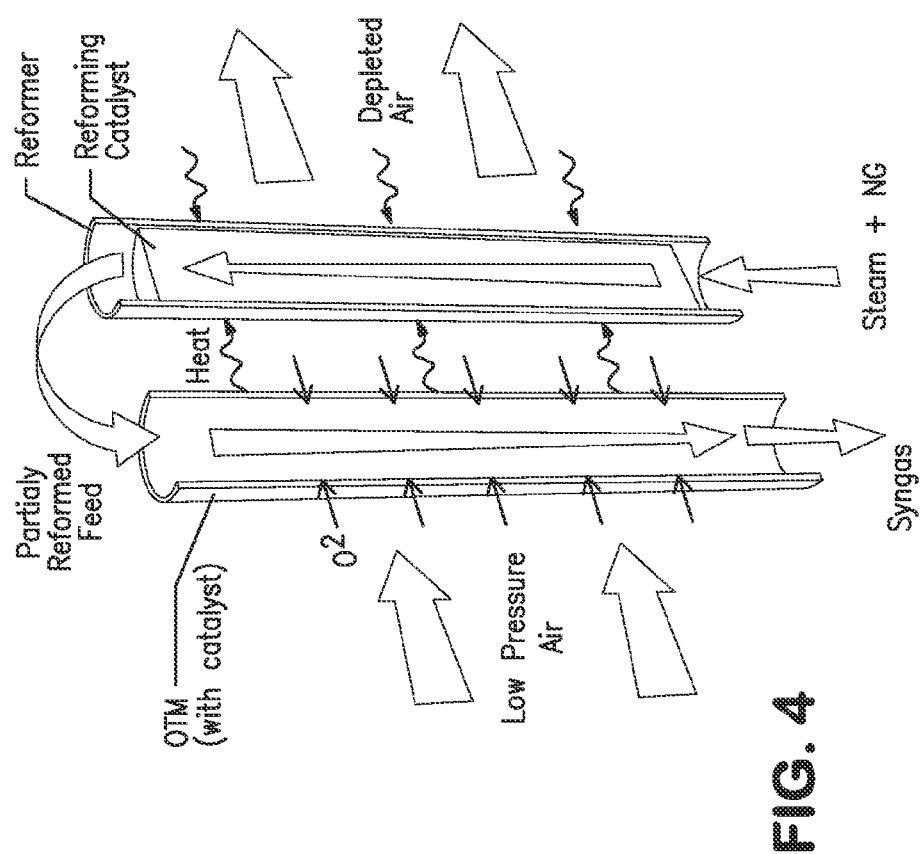

With reference to FIGS. 3 and 4, an alternate embodiment of the oxygen transport membrane based reforming system is shown as an oxygen transport membrane based combined reforming system 401 that preferably comprises two reactors, namely a reforming reactor and oxygen transport membrane reactor. The reforming reactor consists of a plurality of catalyst containing reforming tubes 440 in which primary reforming of a natural gas feed occurs and the oxygen transport membrane reactor consists of a plurality of catalyst containing oxygen transport membrane tubes 420 where the secondary reforming occurs. FIG. 3 depicts a mock-up of the general arrangement of the two reactors and the flows associated therewith. FIG. 4, on the other hand, shows a schematic illustration of the oxygen transport membrane based combined reforming system 401. Although only six secondary reforming oxygen transport membrane tubes 420 are illustrated in FIG. 3 in close proximity to three primary reforming tubes 440, as would occur to those skilled in the art, there could be many of such secondary reforming oxygen transport membrane tubes and many primary reforming tubes in each oxygen transport membrane sub-system. Likewise, there would be multiple oxygen transport membrane sub-systems used in industrial applications of the oxygen transport membrane based combined reforming system 401.

As depicted in the FIG. 3, a heated oxygen containing stream 415 is directed via an intake duct 416 to a plurality of secondary reforming oxygen transport membrane tubes 420 incorporated into the oxygen transport membrane system 401. The secondary reforming oxygen transport membrane tubes 420 are preferably configured as multi-layered ceramic tubes capable of conducting oxygen ions at an elevated operational temperature, wherein the oxidant side or retentate side of the secondary reforming oxygen transport membrane tubes 420 is the exterior surface of the ceramic tubes exposed to the heated oxygen containing stream 415 and the reactant side or permeate side is the interior surface of the ceramic tubes. Within each of the secondary reforming oxygen transport membrane tubes 420 are one or more catalysts that facilitate partial oxidation and reforming of the natural gas.

A hydrocarbon containing feed stream 492, preferably natural gas, to be reformed is typically mixed with a small amount of hydrogen or hydrogen-rich gas 493 and preheated to around 370° C. in heat exchanger 450 that serves as a feed pre-heater. Since natural gas typically contains unacceptably high level of sulfur species, a small amount of hydrogen is typically added to facilitate desulfurization. The heated feed stream 482 undergoes a sulfur removal process via device 490 such as hydro-treating to reduce the sulfur species to $H_2S$, which is subsequently removed in a guard bed using material like ZnO and/or CuO. The hydro-treating step also saturates any alkenes present in the hydrocarbon containing feed stream. Although not shown, the heated feed stream 482 may also undergo a pre-reforming step in, for example, an adiabatic pre-reformer which converts higher hydrocarbons to methane, hydrogen, carbon monoxide, and carbon dioxide or a heated pre-reforming step. In the case of heated pre-reforming, it is contemplated that the catalyst based pre-reformer be thermally coupled with the oxygen transport membrane based reforming system.

Superheated steam 480 is added to the pre-treated natural gas and hydrogen feed stream, as required, to produce a mixed feed stream 438 with a steam to carbon ratio preferably between about 1.0 and 2.5, and more preferably between about 1.2 and 2.2. The superheated steam 480 is preferably between about 15 bar and 80 bar and between about 300° C. and 600° C. and generated by means of indirect heat exchange with the heated retentate stream 424 using steam coils 479 disposed in the retentate duct 425. Any superheated steam 480 not added or used in the natural gas and hydrogen feed 482 is exported steam 481 used for power generation. The mixed feed stream 438 is heated, by means of indirect heat exchange with the heated retentate stream using coils 489 disposed in the retentate duct 425, to preferably between about 450° C. and 650° C., and more preferably between about 500° C. and 600° C.

The heated mixed feed stream 438 is then sent to the reforming tubes 440, which contain a reforming catalyst. The temperature of the partially reformed hydrogen-rich synthesis gas 498 leaving the reforming tubes 440 is typically designed to be between 650° C. and 850° C. This synthesis gas is then fed to the oxygen transport membrane tubes 420 filled with or containing a reforming catalyst. Oxygen from the heated intake air permeates through the oxygen transport membrane tubes 420 and facilitates reaction of a portion of the partially reformed synthesis gas 498. A portion of the energy or heat generated by this reaction is used for in-situ secondary reforming of the residual methane in the partially reformed synthesis gas 498. The rest of the energy or heat is transferred by radiation to the reforming tubes 440 to drive the primary reforming reactions and by convection to the oxygen-depleted stream 424. The synthesis gas 442 leaving the oxygen transport membrane tubes 420, which essentially function as a secondary reformer, is at a temperature between about 900° C. and 1050° C.

The endothermic heating requirements of the reforming process occurring in the primary reforming tubes 440 is supplied through radiation of some of the heat from the secondary reforming oxygen transport membrane tubes 420 together with the convective heat transfer provided by heated retentate stream 424. In addition, as the heated, oxygen depleted retentate stream 424 exits the oxygen transport membrane based reforming system 401, it also heats the mixed feed stream 438 to a temperature between about 450° C. and 650° C. via indirect heat transfer using one or more coils 489 disposed in the retentate stream duct 425.

The rest of the alternate embodiment of the oxygen transport membrane reforming subsystem shown in FIG. 3 is in many respects similar to the embodiment in FIG. 1. For example, an oxygen containing stream 410 is introduced to the system by means of a forced draft (FD) fan 414 into a heat exchanger 413 for purposes of preheating the oxygen containing feed stream 410 to a temperature in the range of about 500° C. to 1050° C.

The oxygen depleted air leaves the oxygen transport membrane reforming tubes as a heated retentate stream 424 at a slightly higher temperature than the heated air feed stream 415. Any temperature increase, typically <50° C., is attributable to the portion of energy generated by oxidizing reaction of hydrogen and carbon monoxide in the oxygen transport membrane tubes and transferred by convection to the air stream, offset by the introduction of supplemental feed air, as described in more detail below. The heated, oxygen depleted retentate stream 424 is first used to heat the mixed feed stream to a temperature between about 450° C. and 650° C., and more preferably to a temperature between 500° C. and 600° C., and may also be used to further heat steam to superheated steam.

The temperature of this oxygen depleted retentate stream 424 preferably needs to be then increased back to a temperature between about 1050° C. and 1200° C. prior to being directed to the ceramic heat exchanger or regenerator 413. This increase in temperature of the retentate stream 424 is preferably accomplished by use of a duct burner 426, which facilitates combustion of a supplemental fuel stream 428 using some of the residual oxygen in the retentate stream 424. It is conceivable that the mixed feed heater and steam superheater could alternatively be located in a separate fired heater (not shown). In that case, the fuel requirements of the duct burner 426 will be substantially less. The resulting cold retentate stream exiting the ceramic heat exchanger, typically containing less than 5% oxygen, leaves the oxygen transport membrane based reforming system 401 system as exhaust gas 432 at a temperature of around 150° C.

Turning again to FIG. 3, the synthesis gas stream 442 produced by the oxygen transport membrane based reforming system 401 generally contains hydrogen, carbon monoxide, unconverted methane, steam, carbon dioxide and other constituents. A significant portion of the sensible heat from the synthesis gas stream 442 can be recovered using a heat exchange section or recovery train 404. Heat exchange section 404 is designed to cool the produced synthesis gas stream 442 exiting the oxygen membrane based reforming system 401. While cooling the synthesis gas stream 442, process steam is generated, hydrocarbon feed stream is preheated, and boiler feed water is heated.

To minimize metal dusting issues, the hot synthesis gas 442 is directly cooled to about 400° C. or less in a Process Gas (PG) Boiler 449. The initially cooled synthesis gas stream 444 is then used to preheat the mixture of natural gas and hydrogen feed stream 482 in a fuel pre-heater 450 and subsequently to pre-heat boiler feed water 488 in the economizer 456 and to heat the feed water stream 459. In the illustrated embodiment, the boiler feed water stream 488 is preferably pumped using a feed water pump (not shown), heated in economizer 456 and sent to steam drum 457 while the heated feed water 459 is sent to a de-aerator (not shown) that provides boiler feed water 488. Synthesis gas leaving the feedwater heater 458 is preferably around 150° C. It is cooled down to 40° C. using a fin-fan cooler 461 and a synthesis gas cooler 464 fed by cooling water 466. The cooled synthesis gas 448 then enters a knock-out drum 468 where water is removed from the bottoms as process condensate stream 470 which, although not shown, is recycled for use as feedwater, and the cooled synthesis gas 472 is recovered overhead.

The cooled synthesis gas stream 472 is optionally compressed in a synthesis gas compressor 474 to produce a synthesis gas product 476. Depending on the operating pressure of the oxygen transport membrane based reforming system, pressure of the recovered synthesis gas is preferably in the range of about 10 bar and 35 bar and more preferably in the range of 12 bar and 30 bar. The module of the synthesis gas produced in the described embodiment is typically less than about 2.0 and often less than about 1.9, whereas for some synthesis gas applications such as methanol synthesis, the desired module of the synthesis gas is preferably in the range of about 2.0 to 2.2. Use of an adiabatic pre-reformer upfront of the OTM reactor can increase the module by about 0.05 to 0.1 relative to the configuration without a pre-reformer. With a heated pre-reformer, it becomes possible to achieve higher modules, preferably greater than 2 and definitely greater than 1.9. The exact module value depends on the operating temperature.

Oxygen Transport Membrane Elements

The oxygen transport membrane panels of the invention preferably comprise one or more oxygen transport membrane repeating units and/or elements. In one embodiment these oxygen transport membrane repeating units and/or elements comprise one or more oxygen transport membrane tubes that incorporate a composite structure that incorporates a dense layer, a porous support and an intermediate porous layer located between the dense layer and the porous support. These tubes can be oval, substantially cylindrical, or cylindrical in structure. Each of the dense layer and the intermediate porous layer are capable of conducting oxygen ions and electrons at an elevated operational temperature to separate the oxygen. The porous support layer would thus form the permeate side. The dense layer and the intermediate porous layer comprise a mixture of an ionic conductive material and an electrically conductive material to conduct oxygen ions and electrons, respectively. In one embodiment the ionic conductive material is composed of a fluorite. The intermediate porous layer has a lower permeability and a smaller average pore size than the porous support layer to distribute the oxygen separated by the dense layer towards the porous support layer. For example, in one embodiment, the oxygen transport membrane element is a mixed phase oxygen ion conducting dense ceramic separation layer comprising a mixture of a zirconia based oxygen ion conducting phase and a predominantly electronic conducting perovskite phase. This thin, dense separation layer is implemented on a thicker inert, porous support.

The intermediate porous layer can have a thickness of from about 10 microns to about 40 microns, a porosity of from about 25 percent to about 40 percent and an average pore diameter of from about 0.5 microns to about 3 microns. The dense layer can have a thickness of from about 10 microns to about 30 microns. The porous surface exchange layer can be provided with a thickness of from about 10 microns to about 40 microns, a porosity of from about 30 percent to about 60 percent and a pore diameter of from about 1 micron and about 4 microns and the support layer can have a thickness of from about 0.5 mm to about 10.0 mm, in another embodiment a thickness of about 0.9 mm and a pore size no greater than 50 microns. The intermediate porous layer can contain a mixture of about 60 percent by weight of (La0.825Sr0.175)0.96Cr0.76Fe0.225V0.015O3-δ, remainder 10Sc1YSZ, the dense layer can be formed of a mixture of about 40 percent by weight of (La0.825Sr0.175)0.94Cr0.72Mn0.26V0.02O3-x, remainder 10Sc1YSZ and the porous surface exchange layer can be formed by a mixture of about 50 percent by weight of (La0.8Sr0.2)0.98MnO3-δ, remainder 10Sc1CeSZ.

In one embodiment the oxygen transport membrane tubes comprise one or more catalysts. For example, catalyst particles or a solution containing precursors of the catalyst particles can be loaded within the oxygen transport membrane tubes. Alternatively, they can be integrated in the intermediate porous layer of the oxygen transport membrane tubes, in the porous support layer adjacent to the intermediate porous layer of the oxygen transport membrane tubes and/or the interior surface of the oxygen transport membrane tubes can coated or activated with said catalyst.

In one embodiment the catalyst particles contain a catalyst selected to promote oxidation of the hydrogen containing stream in the presence of the oxygen when introduced into the pores of the porous support, on a side thereof opposite to the intermediate porous layer. The catalyst can be gadolinium doped ceria. In another embodiment the catalyst is or comprises a reformer catalyst. In yet another embodiment the oxygen transport membrane tubes comprise both a catalyst selected to promote oxidation of the hydrogen containing stream in the presence of the oxygen and a reformer catalyst. Further, a porous surface exchange layer can be provided in contact with the dense layer opposite to the intermediate porous layer. In such case, the porous surface exchange layer would form the retentate side. The support layer is preferably formed from a fluorite, for example 3 mol % yttria stabilized zirconia, 3YSZ.

Oxygen Transport Membrane Reforming Module

From the foregoing discussion, it can be readily appreciated that a reactively driven oxygen transport membrane assembly or module can be constructed or comprised of: (i) a plurality of tubular ceramic oxygen transport membranes configured to transport oxygen ions from an oxygen containing stream present at the outside surface or retentate side of the tubular ceramic oxygen transport membranes to the interior surface or permeate side of the tubular ceramic oxygen transport membranes; (ii) a plurality of catalyst containing reformer tubes disposed adjacent or juxtaposed relationship with the ceramic oxygen transport membrane tubes and configured to produce synthesis gas from the hydrocarbon feed in the presence of a reforming catalyst and radiant heat generated from the tubular ceramic oxygen transport membranes; (iii) a first manifold with associated seals to allow for a flow of a hydrocarbon feed gas and steam through the catalyst containing reformer tubes to produce a synthesis gas; (iv) a second manifold with associated seals to allow for the flow of a hydrogen containing gas such as synthesis gas and steam through the tubular ceramic oxygen transport membranes; (v) a recycle circuit to provide a portion of the synthesis gas produced in the catalyst containing reformer tubes to the tubular ceramic oxygen transport membranes; (vi) an inlet circuit configured to provide steam and supply the hydrocarbon feed to the assembly or module and the plurality of catalyst containing reformer tubes contained therein; (vii) an outlet circuit with exit manifold configured to withdraw the synthesis gas produced in the plurality of catalyst containing reformer tubes from the assembly or module; and (viii) an air staging system configured to supply air or other oxygen containing stream to the exterior surfaces of the plurality of tubular ceramic oxygen transport membranes.

When multiple oxygen transport membrane assemblies or modules are arranged within an insulated duct with a heated oxygen-containing gas such as heated air flowing in a cross flow configuration, synthesis gas will be produced provided the requisite steam, fuel, and hydrogen-containing gas are fed to the process side. Sufficient thermal coupling or heat transfer between the heat-releasing ceramic oxygen transport membrane tubes and the heat-absorbing catalyst containing reformer tubes must be enabled within the design of the assemblies or modules and the arrangement of multiple modules in an array. From about 75% and 85% of the heat transfer between the ceramic oxygen transport membrane tubes and the adjacent catalyst containing reformer tubes is through the radiation mode of heat transfer whereby surface area, surface view factor, surface emissivity, and non-linear temperature difference between the tubes, i.e. $T_{otm}^4 - T_{reformer}^4$, are critical elements to the thermal coupling. Surface emissivity and temperatures are generally dictated by tube material and reaction requirements. The surface area and radiation view factor are generally dictated by tube arrangement or configuration within each module and the entire reactor. While there are numerous tube arrangements or configurations that could meet the thermal coupling requirements between the oxygen transport membrane tubes and the reformer tubes, a key challenge is to achieve a relatively high production rate per unit volume which, in turn, depends on the amount of active oxygen transport membrane area contained within the unit volume. An additional challenge to achieving the optimum thermal coupling performance is to ascertain and optimize the size of the ceramic oxygen transport membrane tubes and the catalyst containing reformer tubes, and more particular the effective surface area ratio, $A_{reformer}/A_{otm}$, of the respective tubes. Of course, such performance optimization must be balanced against the manufacturability requirements, costs, as well as the reliability, maintainability, operating availability of the modules and reactor.

It has been found that significant advantages in these problem areas may be gained by increasing the oxygen transport membrane repeating unit capacity, reduction in catalytic reactor tube diameter, and the module design and tube arrangement. With a reduction in catalytic reactor tube outside diameter from a range of about 2.0 to 3.0 inches found in various prior art systems to an outside diameter range of about 0.6 to 1.0 inches together with a corresponding change in tube arrangement, the amount of active oxygen transport membrane area contained within a unit volume of reactor housing may be dramatically increased.

Figure 9:
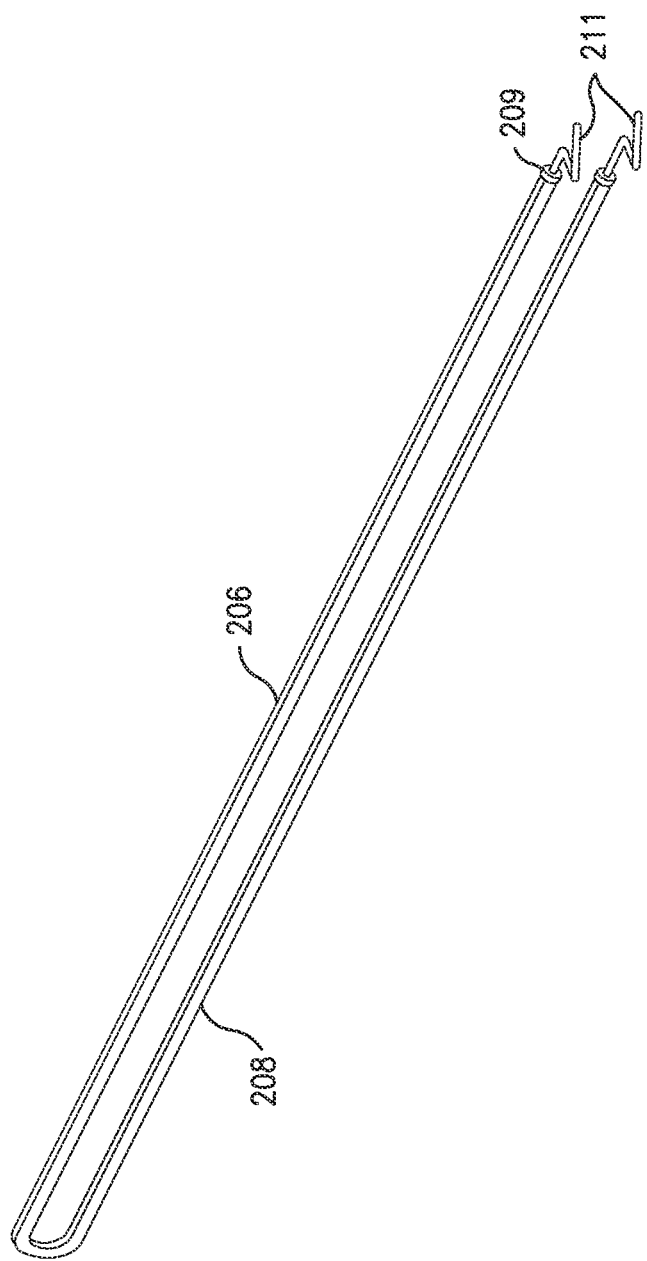
Figure 10:
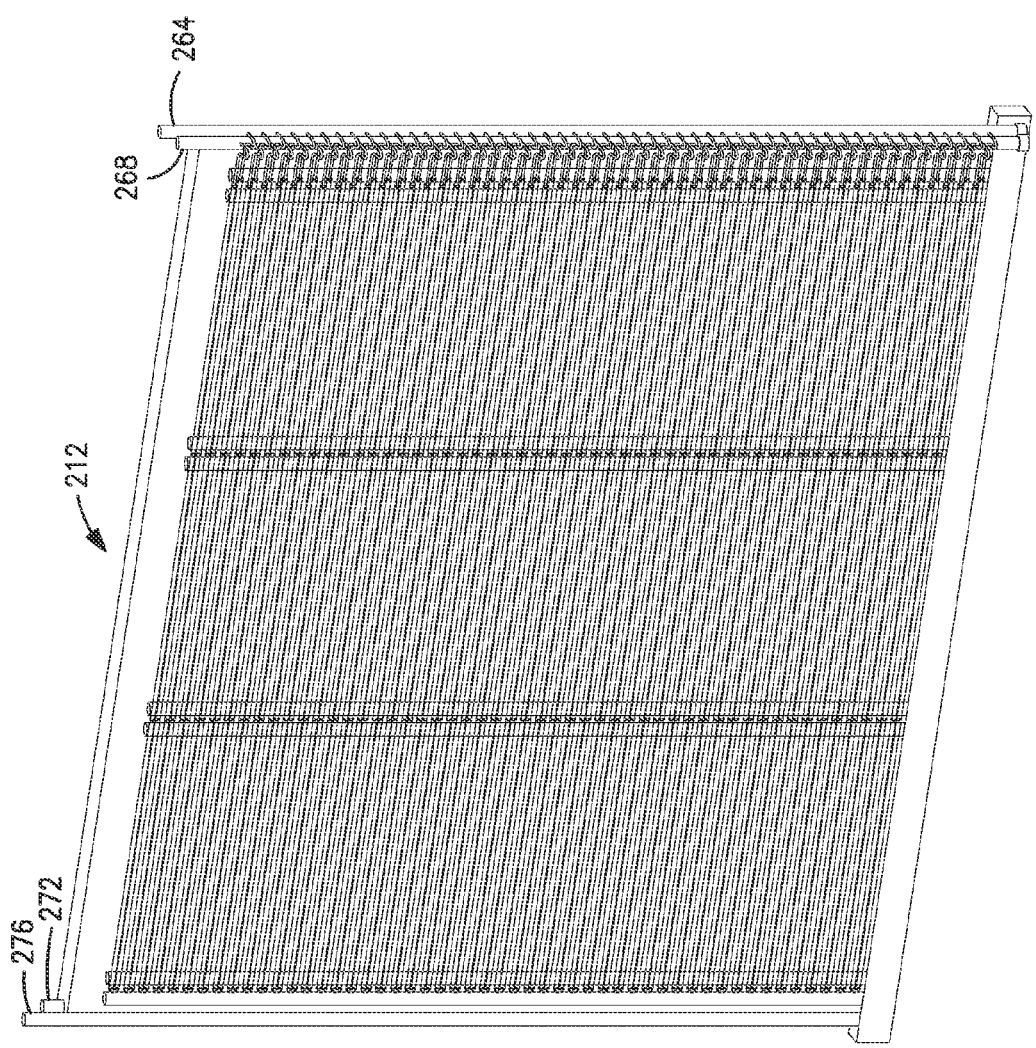
FIG. 10 is a schematic illustration of a dual panel module.

A preferred arrangement of oxygen transport membrane tubes 120 shown in FIG. 1 or 420 shown in FIG. 3 is a first panel arrangement 214 (FIG. 5) comprising a plurality of straight rows oxygen transport membrane tubes/repeating units 204 shown in FIGS. 6A, 6B and 7 adjacent to a second panel arrangement 216 (FIG. 8) comprising plurality of straight rows of catalyst containing reformer tubes/repeating units 208 as shown in FIG. 9. This multiple panel arrangement of oxygen transport membrane tubes and catalyst containing reformer tubes improves the surface area ratio, view factor and radiative heat transfer efficiency between the different tubes. Due to the improved view factor between oxygen transport membrane tubes and reforming tubes, the net tube count and overall tube area of the reforming tubes may be reduced by a factor of 30% to 40% compared to prior art designs. In addition, with a reduction in reforming tube diameter, the required wall thickness to resist creep rupture at the operating temperatures and pressures may be reduced which, coupled with tube count reductions results in significant cost reduction.

As seen in FIG. 9, the improved oxygen transport membrane module design 212 which includes a first oxygen transport membrane panel 214 and a second reformer panel 216 allows for the significant advantages associated with linear row tube arrangement or co-planar tube arrangement and with reduced diameter reforming tubes. The illustrated oxygen transport membrane module design has the additional advantages of being inherently modular and expandable in its approach which enables commercial-scale applications without losing efficiency.

Oxygen Transport Membrane and Catalyst Reformer Panels

The ceramic oxygen transport membrane elements or repeating units 204 utilized in one embodiment of the invention preferably comprise one or more, in another embodiment, two or more oxygen transport membrane tubes comprised of an extruded porous cylindrical substrate which has the active layers coated and fired on the outside cylindrical surface of the substrate. These tubular ceramic membrane elements are produced with high efficiency manufacturing process with an outside diameter in the range of about 8 mm to 20 mm and with a length/diameter ratio in the range of 50 to 75.

As shown in FIGS. 6A and 6B, a preferred coupling arrangement for any final form of the ceramic tubular membrane elements is referred to as a 'hair-pin' arrangement 204 created by adjoining two tubular membrane elements 200 together in pairs with a 180 degree elbow fitting 220 on one end. This 'hair-pin' arrangement represents a repeating unit of the ceramic oxygen transport membrane element. An alternative preferred arrangement is another multi-pass or serpentine arrangement shown in FIG. 7 and referred to as the 'M-pin' arrangement. The illustrated 'M-pin' arrangement comprises at least four (4) oxygen transport membrane tubes or multi-tube leg segments connected in series, including appropriate ceramic to ceramic adapters 224, and two (2) ceramic to metal adapters 228 configured to sealably connect the ends of the 'M-pin' arrangement to form the oxygen transport membrane panel using advanced metal to ceramic seals. The 'M-pin' arrangement further preferably includes a plurality of ceramic U-shaped connectors configured for fluidically coupling adjacent tubes or leg segments, although a single integrated connector assembly could be used. The leg segments can be of equal lengths or different lengths. The illustrated embodiment shows the use of three (3) ceramic U-bend connectors 220 to couple the adjacent tubes to yield the serpentine arrangement. The multi-pass arrangement, such as the depicted 'M-pin' arrangement is preferred from a manufacturability and durability standpoint Employing the 'hair-pin', two-pass, M-pin or other multi-pass arrangement also allows for creating higher capacity repeating units by adjoining multiple tubes together using ceramic connectors 224 to create additional effective length of the active ceramic oxygen transport membrane elements as shown in FIGS. 6A, 6B, and 7. As discussed in more detail below, the end opposite one of the 'hair-pin' ends of the repeating unit is configured to connect to the feed and exhaust manifolds via small metal tubes 232. By placing all the membrane element external connections at a single end of the module allows thermal expansion of the module without placing additional stress on the connections points. Since the oxygen flux along the reacting length of the tubular membrane element is not constant due to progressive oxidation of the fuel gases occurring along the length of the tubular membrane element, this two-pass arrangement in the repeating unit helps to balance temperatures as the more reactive sections of a repeating unit located proximate the feed is adjacent to the less reactive sections of the same repeating unit located near the exit. At the 'hair-pin' end, the adjacent sections are both moderately reactive. The multi-pass repeating unit is constructed by coupling tube ends through a dense ceramic adapter element 224 or dense ceramic 180-degree elbow fitting 220 with glass-ceramic seals that are crystalized during the membrane element assembly firing process. The 180-degree elbow 220 is a dense ceramic part generally produced through ceramic-injection molding and joining processes.

Figure 11:
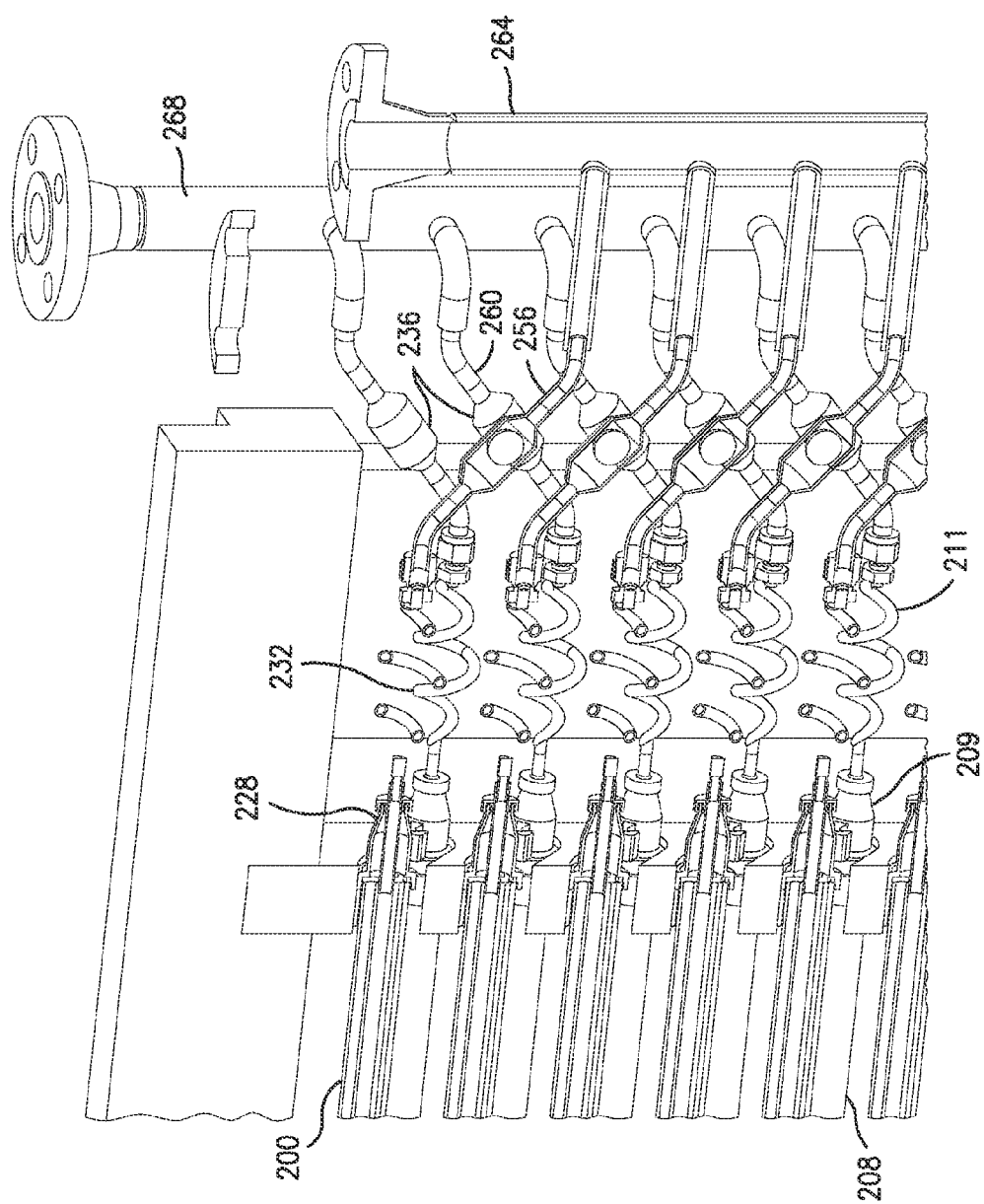
FIG. 11 is a schematic illustration of oxygen transport membrane panel manifolds arrangement.
Figure 12B:
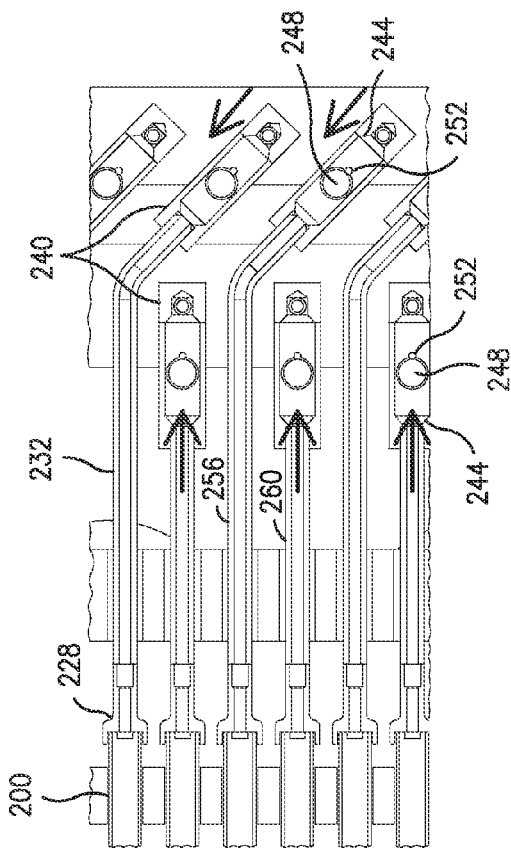
FIG. 12B is an exploded view of said isolation valve.
Figure 12A:
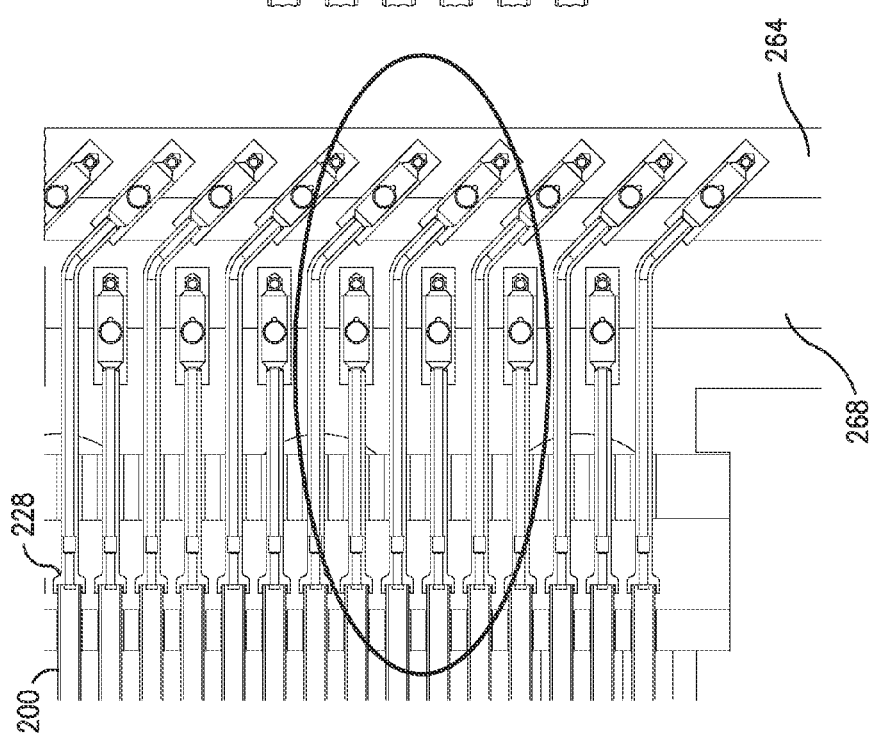

Turning now to FIGS. 11, 12A and 12B, connecting the ends of the repeating unit to the feed and exhaust manifolds is preferably accomplished via small metal tubes. Transition from the end of the ceramic membrane element to metal tubing at the connection end is accomplished by joining a ceramic to metal adaptor 228 connected to the metal tubing directly to the end of the membrane element 200 or through an intermediate dense ceramic adaptor with glass-ceramic seals. Once transitioned to metal tubing, the connection 'pigtails' 232 generally will contain strain-relief bends as well as in-line isolation valves 236 with one or more weld or braze joints facilitating the coupling. The metal tubing at the ultimate feed or exit point of the repeating unit is configured to connect to the corresponding feed or exit manifold through a brazed or welded connection.

In another embodiment the invention contemplates a multi-pass oxygen transport membrane tube reactor comprising a serpentine shaped tube assembly comprising a plurality of coupled oxygen transport membrane tubes, the serpentine shaped tube assembly having a first end in fluid communication with a feed manifold, a second end in fluid communication with an exhaust manifold. The oxygen transport membrane tubes arranged in a parallel or substantial parallel and juxtaposed orientation; and comprise one or more isolation valve assemblies disposed between the first end of the tube assembly and the feed manifold or between the second end of the tube assembly and the exhaust manifold. Each oxygen transport membrane tube comprises a tubular porous support comprising a ionically conducting structured material, in one embodiment a fluorite structured material, a dual phase intermediate porous layer comprising a mixture of an electrically conducting perovskite structured material and an ionically conducting fluorite structure material, the intermediate porous layer disposed on the porous support; and a dual phase dense layer comprising a mixture of an electrically conducting perovskite structured material and an ionically conducting fluorite structure material, the intermediate porous layer disposed on the intermediate porous layer, wherein the interior surface of the porous support defines a reactive side of the oxygen transport membrane tube and the outermost surface of the oxygen transport membrane tube defining a retentate side.

The plurality of coupled oxygen transport membrane tubes are configured to separate oxygen from an oxygen containing stream contacting the outer surface of the oxygen transport membrane tubes through oxygen ion transport through the dense layer and intermediate porous layer to the reactive side of the oxygen transport membrane tubes at elevated temperatures and a difference in partial pressure of oxygen between the retentate side and the reactive side of the oxygen transport membrane tubes.

The oxygen transport membrane tubes can also be configured to receive a stream of a hydrogen containing stream at the reactive side from the feed manifold and oxidize the hydrogen with the oxygen transported through the layers of the oxygen transport membrane tube to produce heat due in substantial part because of the difference in partial pressure of oxygen between the retentate side and the reactive side of the oxygen transport membrane tubes.

The serpentine shaped tube assembly tube assembly can further comprise one or more ceramic straight connectors configured for fluidically coupling two oxygen transport membrane tubes in a linear arrangement and one or more ceramic U-shaped connectors configured for fluidically coupling two adjacent oxygen transport membrane tubes and/or one or more ceramic M-shaped connectors configured for fluidically coupling a plurality of adjacent oxygen transport membrane tubes. The plurality of coupled oxygen transport membrane tubes are configured to operate at a maximum allowable working pressure of 250 psia at the reactive side, in another embodiment, up to 500 psia.

In another embodiment the oxygen transport membrane tube comprises a porous surface exchange layer comprising a mixture of an electrically conducting perovskite structured material and an ionically conducting fluorite structure material and disposed in contact with the dense layer opposite to the intermediate porous layer.

In yet another embodiment the oxygen transport membrane tube reactor comprises a catalyst disposed within the oxygen transport membrane tube. The catalyst can be one that promotes steam reforming of the hydrogen containing feed stream and/or one that promotes the oxidation of hydrogen containing steam.

The isolation valves 236 are simple passive devices comprised of a tubular body 240, a chamfered seat 244, a ceramic ball 248, a restraining pin 252 or feature, and the connection to the tubes at either end (see FIGS. 12A and 12B). Alternatively, a metal or metal alloy ball can be employed instead of said ceramic ball. A single isolation valve assembly may be used at both the entrance pigtail 256 and exit pigtail 260 of the oxygen transport membrane repeating unit. The function provided by this pair of valves is to cut off the gas flow to an individual repeating unit in the case of a seal or membrane breach. On the feed side, the valve assembly is oriented at an angle typically from about 30 and 90 degrees from horizontal with the restraining pin 252 below the ceramic ball on the feed side of the valve. In this orientation, the valve serves as an excess flow valve. The internal bore of the housing, ball diameter, ball material, and angle of the valve is selected such that in the case of a high gas flow into the repeating element due to a seal or membrane breach, the drag forces on the ceramic ball 248 will cause it to lift and convey down the tubular housing 240 until it reaches a chamfered seat feature 244. The included angle of the chamfered seat is typically 45 degrees. At this point, the ceramic ball 248 has a positive shut off with the seat 244 and the flow to the element is effectively interrupted. In the case of an accidental trip or actuation of this valve (start-up, transient etc.) the valve is reset by force of gravity when flow is reduced or stopped in the feed manifold. On the return or exit connection side, the same valve may be placed to serve as a flow check valve (see FIGS. 12A and 12B). In this case, the angle of the valve is not critical (horizontal is typical) as the chamfered seat 244 is on the inlet side of the housing and the restraining pin 252 or feature is on the exit side of the housing. The restraining pin 252 prevents the ceramic ball 248 from sealing off on the exit side of the housing. In the event of a seal or membrane breach, the reverse flow from the pressurized exit manifold towards the breach in the repeating unit will cause the ceramic ball to roll in the direction of reverse flow towards the chamfered seat. Once engaged, a positive shut-off condition of the ceramic ball 248 to the chamfered seat 244 will be present and reverse flow to the repeating unit will be interrupted. Housing materials and connections are typically of a high temperature alloy such as Inconel 625 or Incoloy 800HT and the ball material is typically alumina or zirconia ceramic material as it resists sticking or bonding with the metal materials of the housing and seat. For the excess flow valve at 45 degree orientation, with dense alumina ball material, the desired flow-to-close setpoints for a range of membrane repeating unit capacities are achieved with ball diameter to bore diameter ratios of about 0.5 to 0.9 and balls of 0.18 inch to 0.32 inch nominal diameter.

Figure 13C:
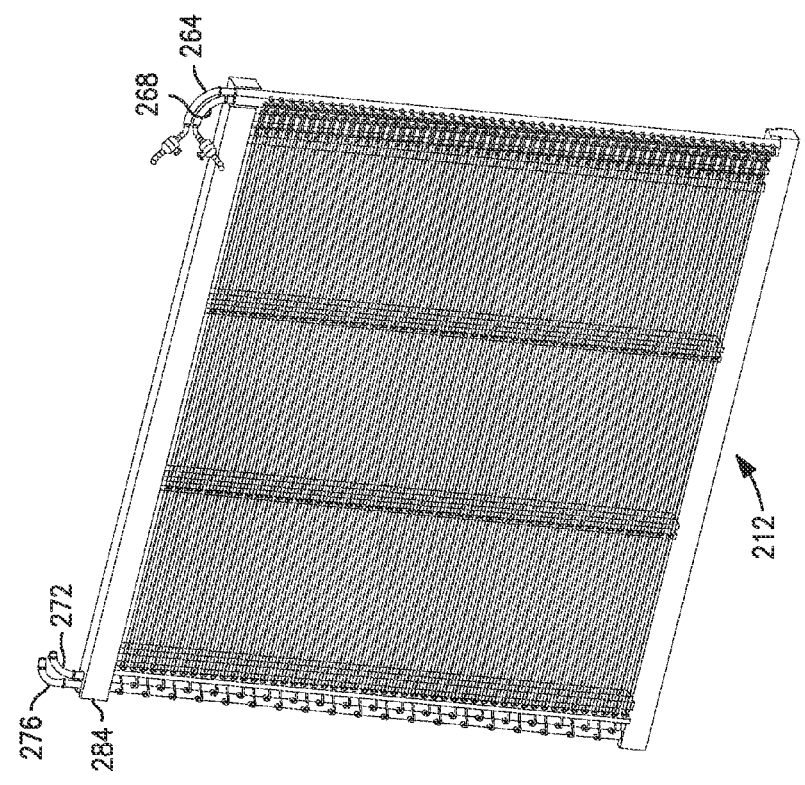
FIGS. 13A-C are a schematic illustrations of expandable dual panel module arrangements.
Figure 13B:
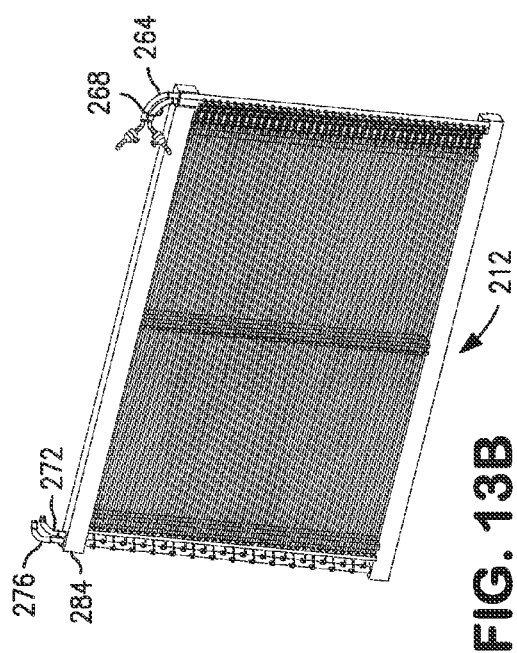
Figure 13A:
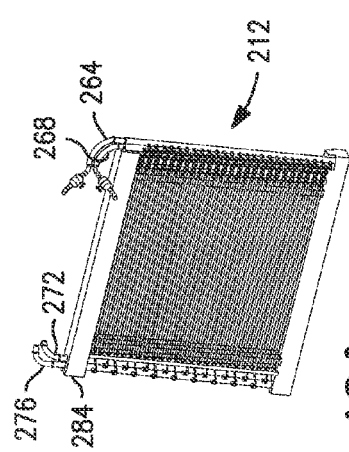

The feed manifold 264 and exit manifold 268 are generally configured as pipe or tubing with multiple holes, ports, or sockets spaced at a prescribed distance along its length. The manifolds generally are placed side-by-side, with the ports facing in the same direction. The manifolds are capped generally at one end and with the manifolds placed side-by-side in a generally parallel orientation. The flow is designed to enter via the feed manifold 264 through the oxygen transport membrane tubes 200 and exit via the exit manifold 268 such that the bulk flow in the manifolds is in a counter-flow arrangement. The feed 264 and exit manifolds 268 are preferably placed into a frame 284 (FIGS. 13A-C) made of either a metal or refractory board material. Refractory materials such as Duraboard™ HD from Unifrax Inc. or calcium-silicate material from Zircar Inc. are preferred choices of refractory material. Metal frame material is preferred for cost and manufacturing efficiency. Care must be taken to minimize chromium containing vapor emission from the metal alloy as well as have sufficient strength and oxidation resistance. Alumina-scale forming austenitic stainless steel such as AFA alloy is a good choice for the material as is Haynes 224.

The metal frame is preferably stamped or cut, and folded or formed, and welded together to create a frame structure with structural rails capable of holding or retaining the plurality of oxygen transport membrane repeating units in straight parallel rows thus forming a first panel assembly 214 or arrangement. The oxygen transport membrane repeating units are generally arranged horizontally within the support frame 284 with the rail features generally engaging and retaining long repeating unit assemblies at several points. Engagement between the support frame and oxygen transport membrane repeating units is preferably at or near the junction between adjacent tubes. The preferred engagement and retention of the oxygen transport membrane repeating units by the frame support should allow side to side movement of the tubes along their axis so as to allow the oxygen transport membrane elements to expand and contract without additional stress.

To assemble an oxygen transport membrane panel assembly, the manifolds are first placed into the frame support 284 on a single side and the plurality of oxygen transport membrane repeating units, already as sealed sub-assemblies, are placed into the engagement or retention features in the frame support 284 with the metal tubing ends inserted into the ports or sockets of the corresponding manifold. These connections are then individually TIG welded or torch-brazed or vacuum furnace brazed all at once in a batch process. Braze alloy is typically nickel braze with Nicrobraze™ 210, 152, 33, 31.

In one embodiment, the plurality of OTM tubes 204 are welded to the inlet 268 and outlet manifolds 264 and the outlet manifolds are welded to the frame members at the top and bottom of the panel. To minimize stress due to thermal expansion, the outlet manifold is welded to the frame in only one position. In one embodiment, the outlet manifold is welded to the frame at the top of the panel (FIG. 5, frame not shown).

In another embodiment the OTM tubes 204 are supported by the frame. One means of support is to rest the tubes in slots cut into the frame members. In another embodiment the inlet 268 and outlet manifolds 264 are positioned in a second plane (FIG. 11). The acute angle formed between this second plane of the manifolds and the plane of the plurality of OTM tubes is 45 degrees or less and such that at least one of the manifolds is positioned at a distance of from 2 to about 5 times the diameter of the OTM tubes in a direction normal to the plane of the plurality of OTM tubes.

A similarly constructed second panel may be formed from catalytic reformer repeating units 208 (See FIGS. 8 and 9). In this case, the reforming tube 208 or housing is constructed using metal tubing or pipe preferably made from a suitable wrought material like Incoloy 800HT. These tubes can be oval, substantially cylindrical, or cylindrical in structure. A continuous length of 0.75 inch tubing or 0.5 NPS pipe can be bent to form two parallel legs 206 and a 180-degree turn at one end. This two parallel leg arrangement provides a multi-pass reforming of the feed that intensifies the reforming process while maintaining excellent thermally coupling with the adjacent radiant heat generating oxygen transport membrane tubes. As seen in the drawings, the catalytic reforming tubes are configured as a serpentine tube, or more preferably a U-shaped tube, containing steam methane reforming catalysts and the reactors are arrayed in cross-flow arrangement with the air stream. This two pass flow design provides more residence time, increases surface area and serves to improve the radiative view factor between the oxygen transport membrane and catalytic reforming reactors.

In one embodiment, the plurality of reforming tubes 208 are welded to the inlet manifold 272 and outlet manifold 276. The inlet manifold 272 and the outlet manifold 276 are welded to the frame members at the top and bottom of the panel (FIG. 8, frame not shown). To minimize stress due to thermal expansion, the outlet manifold is welded to the frame in only one position. In one embodiment, that position is at the top of the panel.

The reformer tubes 208 are supported by the frame. One means of support is to rest the tubes in slots cut into the frame members. The inlet 272 and outlet 276 manifolds of the reformer panel are positioned in a third plane. The acute angle formed between this third plane of the manifolds and the plane of the plurality of reformer tubes is 45 degrees or less such that at least one of the manifolds is positioned at a distance of less than about two times the diameter of the reformer tubes in a direction normal to the plane of the plurality of reformer tubes.

The reformer tubes, if made from a nickel-chrome, or iron-nickel-chrome metal alloy with less than approximately 3% aluminum by weight will preferably need to be coated or surface treated with a suitable alumina-based chromium barrier on all external or exposed surfaces using selected coating materials and processes available from Hitemco, Nextech, or Praxair Surface Technologies, Inc. The catalytic reforming tubes may be filled with various metal or ceramic catalyst support materials. Examples of the catalyst support materials may include folded metal foils, metal mesh, metal foam, or metal/ceramic pellets or other extruded forms with an appropriate steam reforming catalysts impregnated or wash-coated on exposed surfaces. The interior surface of the reforming tube may also be optionally coated or activated with steam reforming catalysts. End caps 209 (FIG. 9) facilitating the transition from the reformer tubes to smaller diameter metal tubing pigtails 211 (FIG. 9) are also preferably coated with a chromium barrier layer surface treatment and welded or brazed onto the reforming tube to complete the catalytic reformer repeating unit. To facilitate the welding and/or brazing operation, the faying surfaces of the components to be joined can be masked to prevent alumina formation at the surfaces of the joint. Alternatively, the entire catalytic reforming tube sub-assembly can be coated with the chromium barrier surface treatment in batch after the components are joined as long as the metal tubing connections at the entrance and exit points have a masked surface to facilitate joining to the manifolds. Note that there is no need or requirement for isolation valves in line with the feed and exit ports of the catalytic reformer repeating unit.

In similar fashion as the ceramic oxygen transport membrane repeating elements (OTM repeating units), the catalytic reformer repeating units are assembled horizontally into a suitable frame support with support or retention means provided at several points along the reformer tube length. In this manner, the reforming tubes are free to expand and contract without additional stresses caused by the support frame. The end connection points for each catalyst reforming repeating units are preferably brazed or welded to the feed and exit manifolds in similar fashion as the ceramic oxygen transport membrane repeating units were brazed or welded to the corresponding feed and exit manifolds. With all catalytic reformer repeating units installed in the panel forming parallel rows of reforming tubes that are welded or brazed to the manifolds, a catalytic reforming panel is completed. The total length of each leg in any catalytic reformer repeating unit tube preferably matches the total length of a single leg of the oxygen transport membrane repeating unit.

The first oxygen transport membrane panel assembly and the second catalytic reformer panel assembly are preferably stacked or nested together to form a module, sometimes referred to as a dual panel module, with the rows of oxygen transport membrane tubes disposed juxtaposed or adjacent to the rows of catalytic reformer tubes. One or more of these dual panel modules may be stacked together to form an array of oxygen transport membrane tubes interleaved with an array of catalytic reformer tubes. This array has a characteristically high view factor between the oxygen transport membrane tubes and catalytic reformer tubes and a relatively low number of catalytic reformer tubes required to achieve thermal balance. In the preferred array, there is preferably between about two and four, and more preferably three or four oxygen transport membrane tubes per catalytic reformer tube. The inlet and exit manifolds for the oxygen transport membrane panel and the inlet and exit manifolds for the catalytic reformer panel are preferably on opposite sides of the combined panel or dual panel module when fully assembled. This arrangement facilitates simplified manifold connections as well as a reduced thickness and tighter array for the combined panel or dual panel module. Although not shown, the oxygen transport membrane panels and catalytic reformer panels may alternatively be arranged in a single panel module with alternating layers in lieu of the dual panel subassembly arrangement.

In one embodiment, the frame for the first OTM panel may be integral to the frame for the first reforming panel in that some of the frame elements are common. In one such embodiment, the inlet and outlet reforming manifolds and the first reforming panel are assembled to a first frame. Next, at least two additional frame structures are added to the first frame, making a second frame. Finally, the inlet and outlet OTM manifolds and the first OTM panel are assembled to the second frame.

Modular Oxygen Transport Membrane Based Reforming Reactor

The combination of a single oxygen transport membrane panel 214 and a single catalytic reformer panel 216 into a dual panel module forms a basic modular unit 212 of oxygen transport membrane based reforming reactor 101 depicted in FIG. 1 or reactor 401 depicted in FIG. 3. Coupling or integrating multiple dual panel modules 212 increases processing capacity and thus synthesis gas production capacity. For any application of the oxygen transport membrane based reforming reactor, the exact panel size and number of dual panel modules (FIGS. 13A-13C) may be chosen to best fit the requirements. However, most practical applications of the oxygen transport membrane based reforming reactor may require a large number of panels. To that end, an additional level of integration and modularization is depicted in FIG. 14, where multiple dual panel modules are stacked within a refractory-lined steel container or housing and manifolded together to form an easily installed and connected oxygen transport membrane based reforming reactor pack assembly. Advantageously, these oxygen transport membrane based reforming reactor pack assemblies can be produced or fabricated in a shop and transported to the plant site for installation. In addition, these multiple module pack assemblies facilitate simplified handling, connecting, and servicing for plant personnel as they are easily installed or removed.

Figure 15:
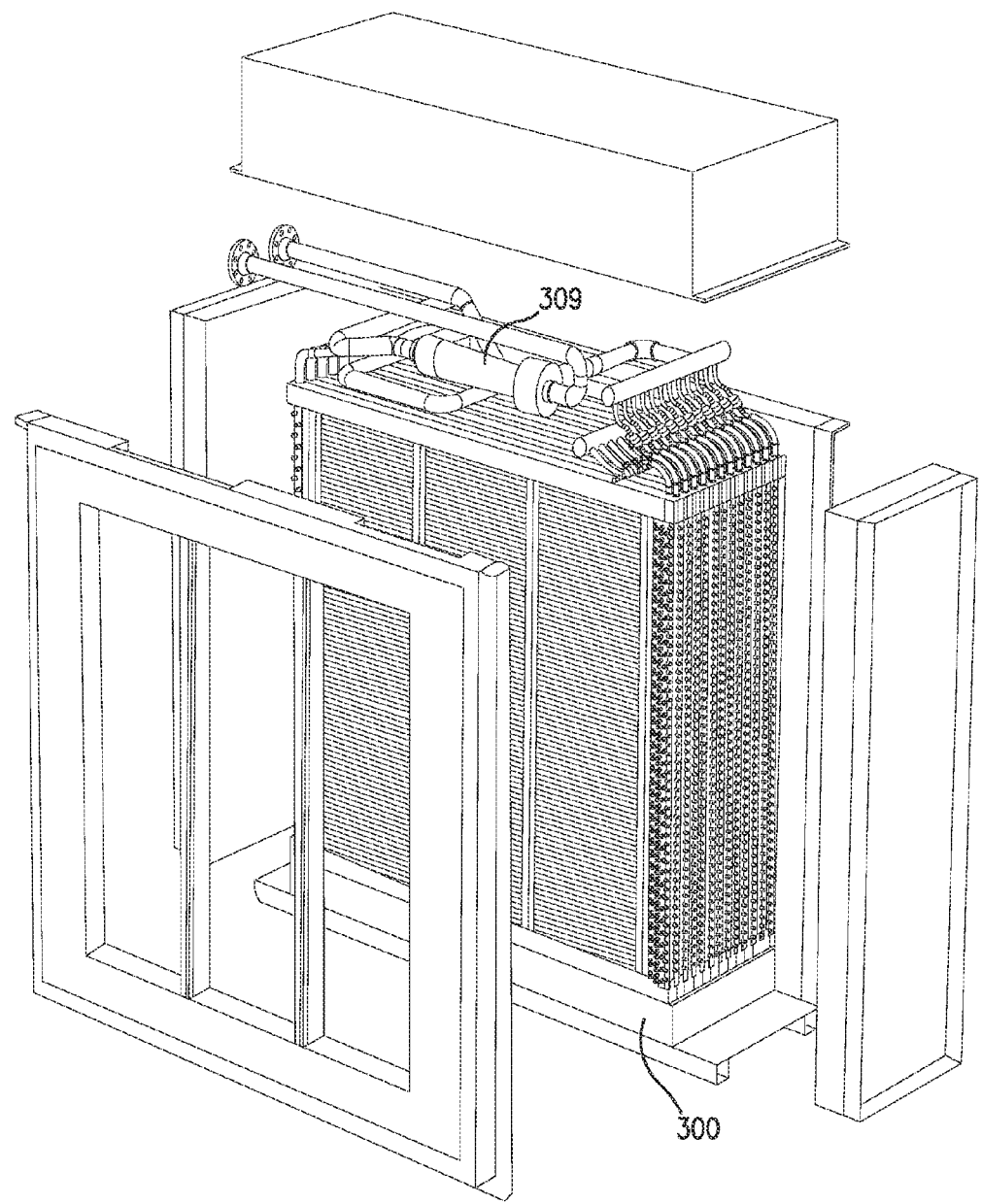
FIG. 15 is a schematic illustration of an oxygen transport membrane reactor pack assembly.
Figure 16:
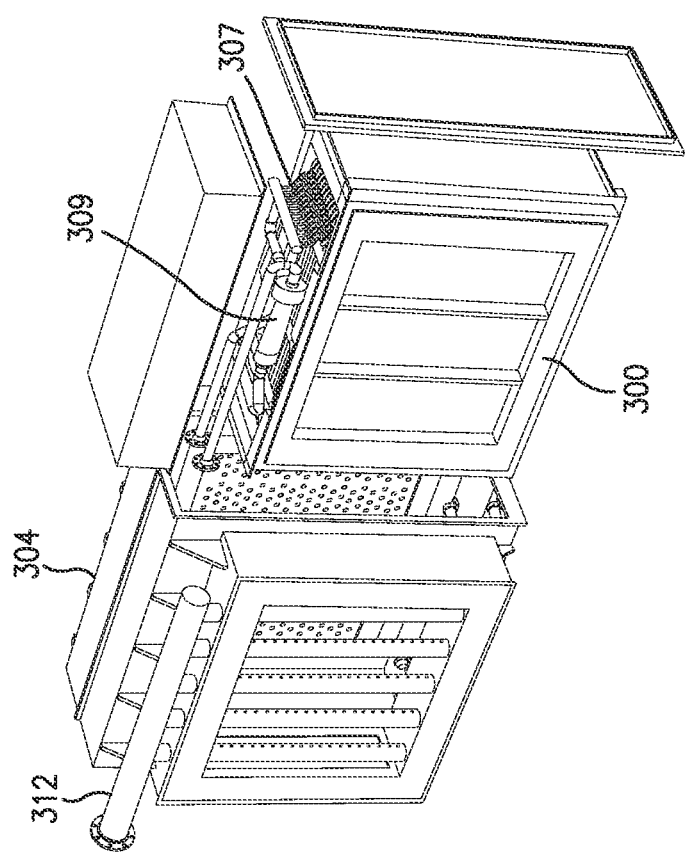
FIG. 16 is a schematic illustration of an alternate oxygen transport membrane reactor pack assembly with air staging provision.

As depicted in FIG. 14, one or more of the dual panel modules can be stacked together in a refractory lined housing 304 to form the core of a pack assembly 300. From six and twenty dual panel modules are preferably stacked within each pack assembly. FIG. 15 is one configuration of an oxygen transport membrane reactor pack assembly containing stacked dual panel modules 300, a dedicated section or zone 307 comprising header arrangements to feed inlet manifolds and withdraw process streams from outlet manifolds of various panels. FIG. 16 is an alternate configuration of an oxygen transport membrane reactor pack assembly also containing provision for air staging. The pack assembly housing is preferably a carbon steel structure that provides an open window areas to allow air or other oxygen containing stream to flow across the oxygen transport membrane tubes and through the dual panel modules 212. The housing also has refractory lining partially surrounding the stacked dual panel modules and configured to provide thermal insulation between the high temperature region containing the dual panel modules and a dedicated section or zone of the pack assembly configured to contain the inlet circuit, outlet circuit and recycle circuit. The pack assembly housing also provides the structural support, access panels, lift points, etc. The multiple dual panel modules within a pack assembly are typically manifolded together within the pack assembly in the dedicated section or zone 307 of the pack assembly, preferably located above or on top of the dual panel modules. This dedicated section or zone preferably includes an inlet circuit configured or adapted to provide a mixed-preheated-feed (e.g. natural gas and steam) to the feed manifolds associated with the catalyst reformer panels 216 and oxygen transport membrane panels 214 and an outlet circuit configured or adapted to receive and withdraw the synthesis gas produced in the catalyst containing reformer panels 216.

The dedicated section or zone also includes a recycle circuit adapted to provide a portion of the synthesis gas from the exit manifolds of the catalytic reformer panels 216 to the feed manifold 264 associated with the oxygen transport membrane panels 214. Using the recycle circuit, a portion of the synthesis gas, preferably about 25% to 50% is pulled through to the feed manifold of the oxygen transport membrane panels as a recycle flow. In one embodiment, each pack assembly includes one or more gas recycle ejectors (e.g. thermo-compressors) 309 that are used to facilitate the recycle of a portion of the synthesis gas product stream from the exit manifold associated with the reformer panel to the oxygen transport membrane panel feed manifold. The recycle ejectors within a pack assembly use the preheated, pressurized mixed steam and natural gas feed as the motive flow. The suction side of the recycle ejectors are attached to the exit manifold of the reformer panels such that the motive flow entrains the synthesis gas from the suction side and drives the gases through a converging/diverging nozzle which helps to convert momentum energy to static pressure recovery. In general, the mixture of natural gas and steam motive flow and recycled synthesis gas is directed to the feed manifold of the oxygen transport membrane panels. The mixed feed of natural gas and steam discharged from the oxygen transport membrane panels via the exit manifold together with the reaction products from the oxidization of the synthesis gas in the oxygen transport membrane panels is then directed to the feed manifold associated with the reforming panels.

The preferred ejectors are available from Fox Venturi Products Inc. and can produce a discharge pressure to suction pressure ratio of about 1.05-1.15 on an absolute pressure basis, with a motive pressure to discharge pressure ratio of about 1.45 or above under target gas compositions and temperatures as dictated by the process conditions. Material of construction is of similar material as pack housing and panel manifolding (e.g. Inconel 625 or Incoloy 800HT) depending on expected service conditions. Due to the inherent process capacity throttling available through modulation of recycle ratio, it is desirable to have control over recycle flow rate. One preferred embodiment to effect such control is to use two or more ejectors, preferably two or three ejectors arranged in parallel on the discharge and suction sides. The motive flow is split and separately fed to the inlet of each ejector. In an arrangement using three ejectors, the ejectors are sized in a 1:2:4 relative ratios whereas in the arrangement using two ejectors, the ejectors are sized roughly in a 1:2 relative ratio.

With this multiple ejector configuration, control is effected by selecting which combination of eductors or ejectors is receiving the motive flow. For example, in the arrangement using three ejectors or eductors, a total of seven distinct flow levels of recycle may be engaged. Similarly, a total of three distinct flow levels of recycle may be realized in embodiments using two ejectors or eductors. A flow-controlled mixed-feed of natural gas and steam would bypass the recycle ejectors directly to the feed manifold of reforming panels as a make-up feed to keep tight control on the oxygen/carbon ratio of the reforming process. The oxygen transport membrane based reforming reactor pack can also optionally comprise a force or pressure actuated valve, door or moveable panel to provide pressure relief for the pack assembly.

Oxygen Transport Membrane Furnace Train

Figure 17:
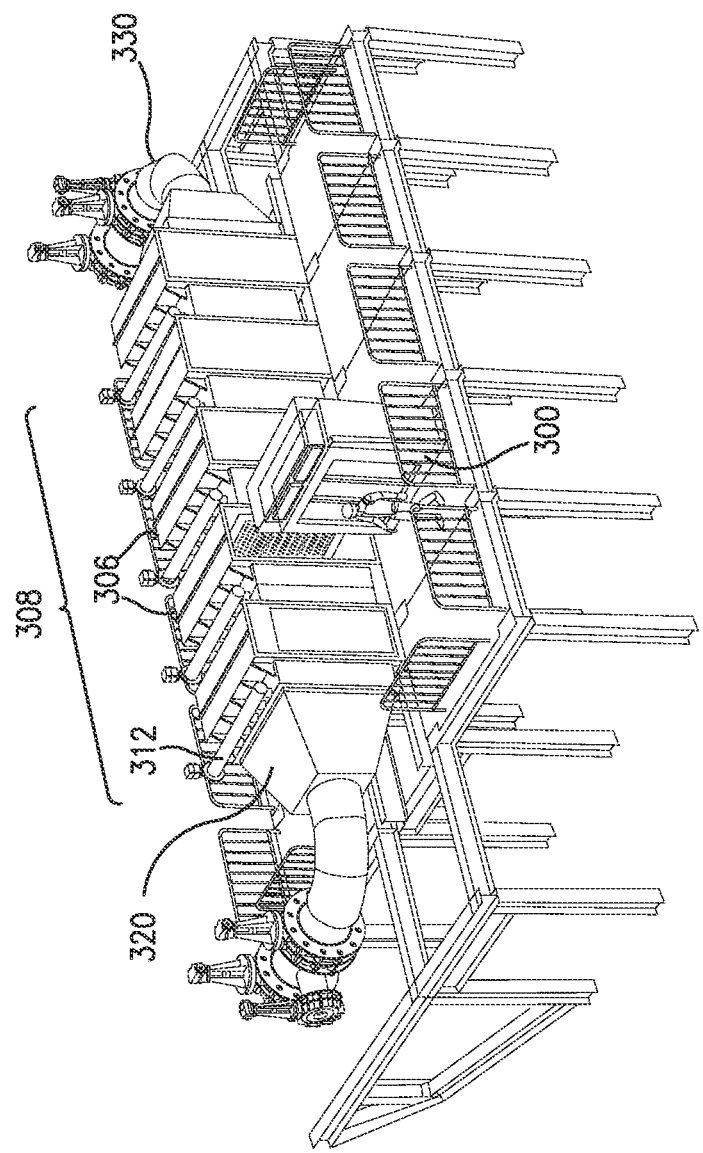
FIGS. 17 and 18 are schematic illustration of a furnace train and multiple furnace trains, respectively.
Figure 18:
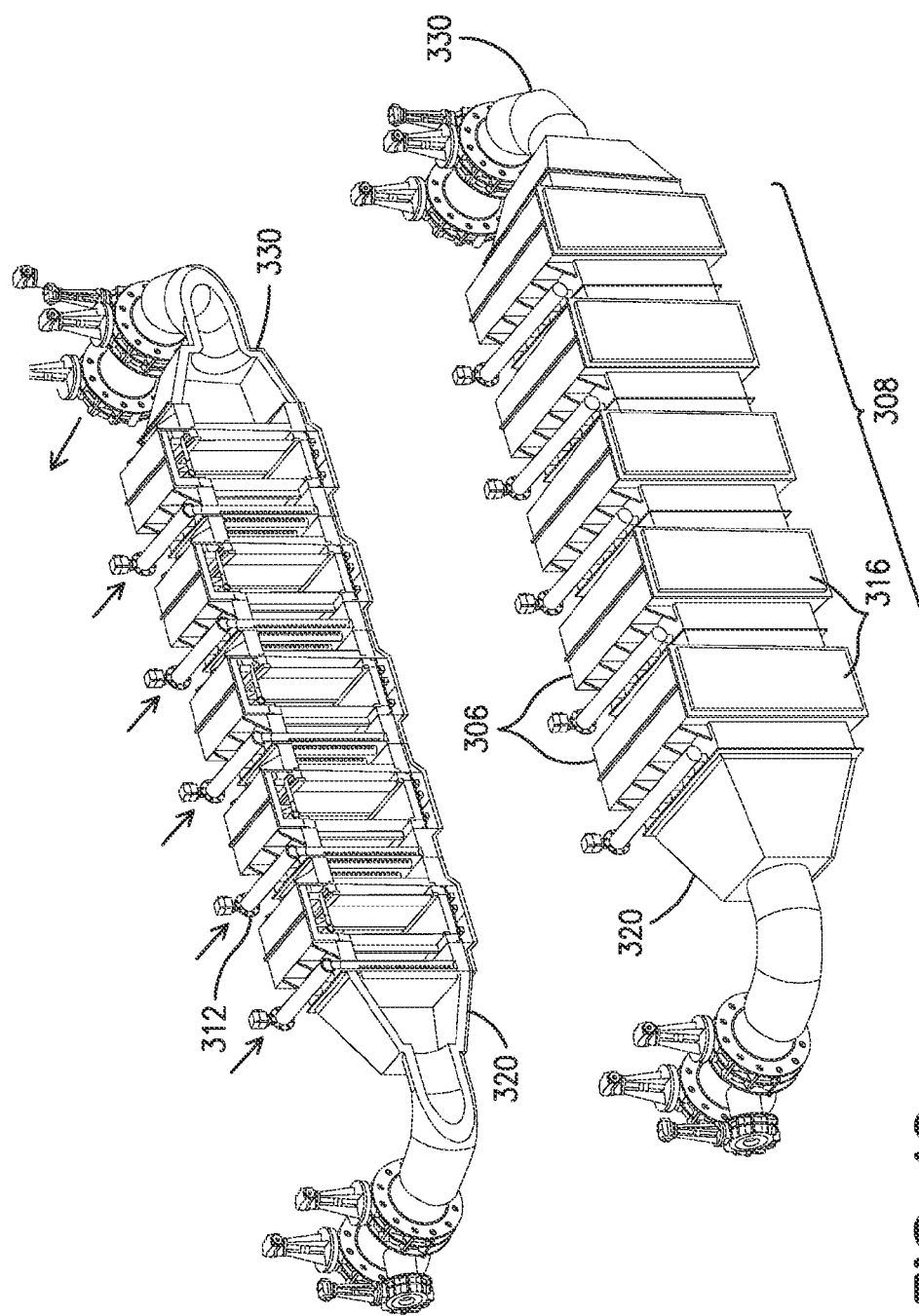
Figure 19:
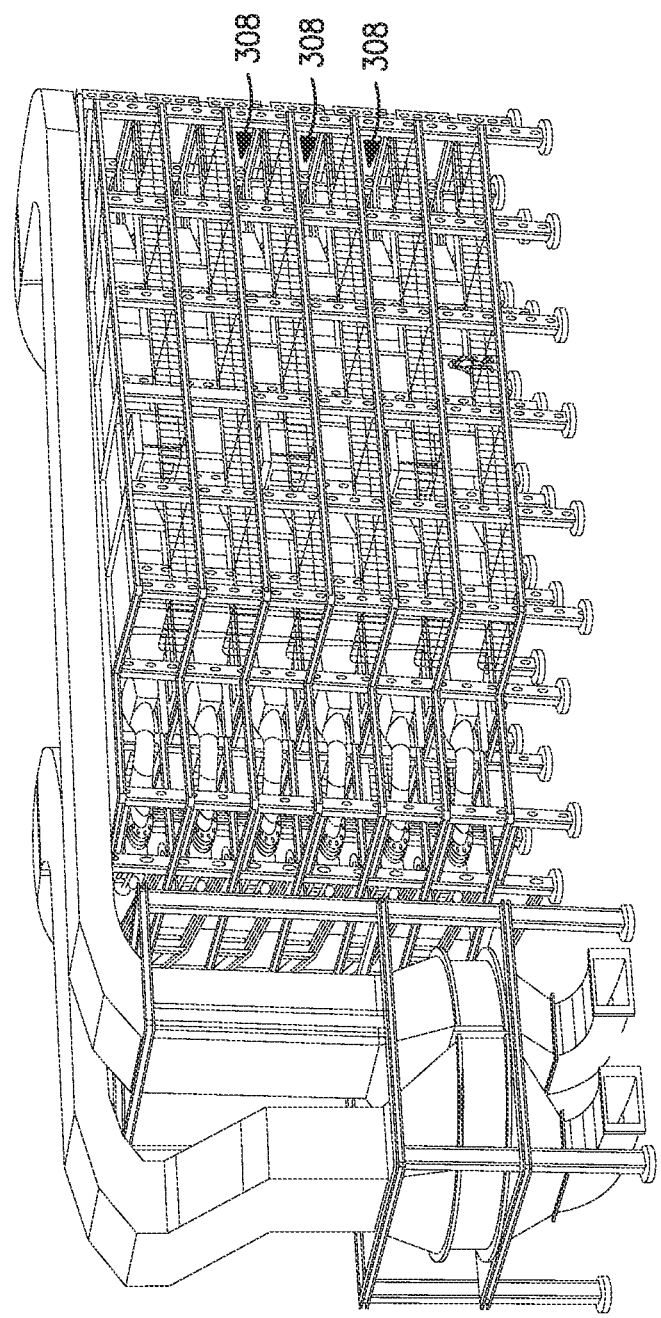
FIG. 19 is a schematic illustration of multiple furnace arrangements in a large-scale synthesis gas production system.

As seen more clearly in FIG. 17, each oxygen transport membrane based reforming reactor pack assembly 300 is envisioned to slide into a hot box or furnace segment 306. Alternatively pack assemblies can be joined together to form a hot box or furnace segment. These furnace segments may be produced individually and connected together in series to form an oxygen transport membrane furnace train 308. Alternatively, a single long hot box or furnace configured to accept multiple oxygen transport membrane based reforming reactor pack assemblies may be fabricated and shipped to the plant or constructed on site. In either embodiment, the oxygen transport membrane based reforming reactor packs are generally installed in series in the oxygen transport membrane furnace train 308. Each train is configured to be connected to an air feed system 320 and retentate withdrawal system 330 (FIG. 17). Multiple oxygen transport membrane furnace trains 308 may be arranged in parallel to form a large-scale reformer as shown in FIGS. 18 and 19. In furnace train arrangements comprising two or more oxygen transport membrane based reforming reactor pack assemblies, it may be advantageous to provide an air staging system 312 to provide supplemental cooling air or trim air as well as furnace pressure relief means 316 between adjacent multiple oxygen transport membrane based reforming reactor pack assemblies in the furnace train.

To meet capacity requirements, the size of the dual panel module 212 may be increased in width and height and the length of the oxygen transport membrane furnace train 308 may be increased. As shown in FIG. 13 the dual panel module 212 width can be increased by increasing the number of ceramic oxygen transport membrane repeating units 204 in the oxygen transport membrane panel 214 and increasing the effective length of the reformer repeating units 208 in the reformer panel 216. The dual panel module 212 height can be increased by increasing the number of multi-pass oxygen transport membrane repeating units 204 and reformer repeating units 208 in the oxygen transport membrane panel 214 and reformer panel 216, respectively. The dual panel module 212 width and height may be increased such that the internal fluid pressure drop through the elements of the panel does not exceed the maximum pressure drop allowed based on the process requirements of the plant. As shown in 17 the length of the train may be increased by increasing the number of oxygen transport membrane furnace packs 300 in a train such that the retentate-side oxygen concentration does not decrease to below a minimum allowable range of 6 mole % to 15 mole % at the entrance to the last reactor pack assembly 300 in the train 308. The preferred limit is 10 mole % oxygen concentration.

Multiple furnace trains (308) may be installed to satisfy plant capacity requirements. The preferred arrangement is to install the furnace trains (308) in parallel circuits as shown in FIGS. 18-19. Each furnace train 308 contains means for fuel supply, product output, air supply, retentate output, pressure relief, and supplemental cooling air or trim air. Pressure relief devices 316 and supplemental cooling air means 312 may be installed as required between adjacent reactor pack assemblies, or preferably each reactor pack assembly 300 is constructed with dedicated means for pressure relief and supplemental cooling air. The parallel architecture allows for maintenance of one train while the remaining trains remain operating, increasing plant up-time.

The present embodiments of an oxygen transport membrane based reforming reactor provides a commercially viable method of producing synthesis gas that has clear cost advantages and carbon footprint advantages compared to existing SMR and/or ATR solutions.

Oxygen Transport Membrane Based Gas Heating Reactor

In another aspect, the present invention may be characterized as an improved oxygen transport membrane based (supercritical) steam generator or process heater or gas heating reactor for producing steam or other heated process fluid or a reactor for carrying out chemical reactions. The improved reactor and system provides enhanced thermal coupling of oxygen transport membrane tubes and steam/fluid tubes as well as improved manufacturability, maintainability and operability compared to previously disclosed oxygen transport membrane based steam generating systems and reactors.

Figure 20:
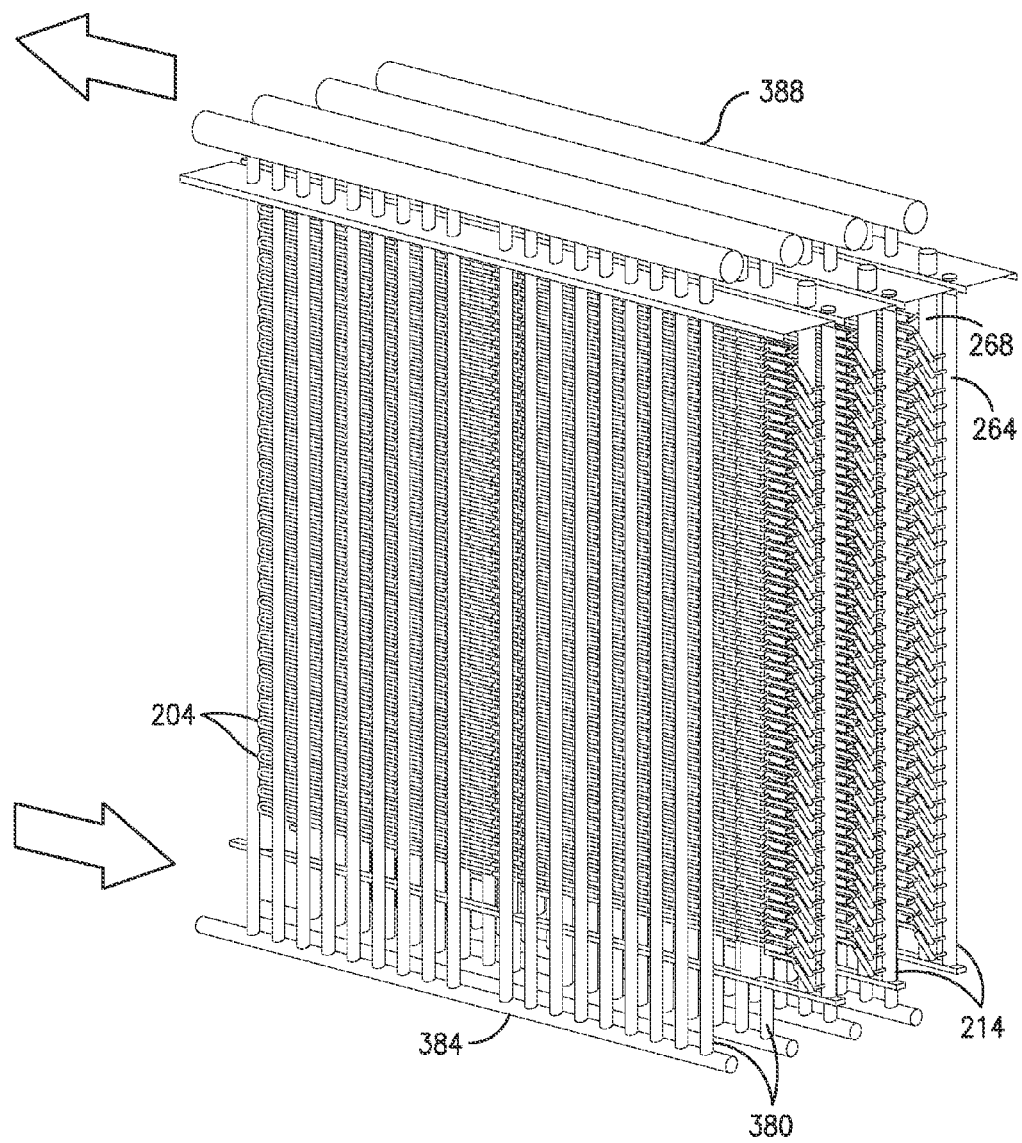
FIG. 20 is a schematic illustration of an oxygen transport membrane steam generator arrangement.

Turning now to FIG. 20, there is shown a conceptual design of an oxygen transport membrane based steam generator, in which a panel array 214 type arrangement of oxygen transport membranes similar to that described above with reference to the oxygen transport membrane based reforming reactor are used. The oxygen transport membrane steam generator is arranged in a modular fashion integrating oxygen transport membrane arrays or panels 214 and separate steam generator tube arrays 380. The arrays or panels are connected generally in a parallel orientation (although non-parallel arrangements can be employed) and can be increased in size or quantity to accommodate larger boiler capacities. The arrays or panels are preferably housed in an insulated hot-air duct with a common feed water drum 384 arranged in a cooler zone and a common steam drum 388 arranged in a separate zone. Process gas connections are arranged on one side of the reactor, making the other side accessible for maintenance.

The integrated packing arrangement of oxygen transport membrane tubes and steam/fluid tubes provides for efficient heat transfer, primarily through radiation. Alternatively, the arrangement of oxygen transport membrane panels and adjacent heat transfer panels having a fluid passing therethrough, can be used to provide supplemental heat to the process or in some instances a cooling source to prevent overheating of the system or otherwise to manage the thermal load of the oxygen transport membrane module or assembly. This concept also provides an oxygen transport membrane based steam generator or other gas heating reactor to have similar advantages as the above-described oxygen transport membrane based reforming reactor with respect to packing density, modularization, low cost manufacturing, shop-fab modules, and scalability. The integrated packing arrangement of oxygen transport membrane tubes and steam/fluid tubes shown in FIG. 20 can be adapted to configure oxygen transport membrane based process fluid heaters and/or reactors.

What is claimed is:

1. An oxygen transport membrane panel for transferring radiant heat to a plurality of steam generators, the oxygen transport membrane panel comprising:

a panel frame; and a plurality of oxygen transport membrane repeating units arranged in a tightly packed linear and co-planar orientation;

wherein each oxygen transport membrane repeating unit comprises two or more oxygen transport membrane tubes coupled together configured to be in fluid communication with either a feed manifold or an exhaust manifold;

wherein each oxygen transport membrane tube having a permeate side located on an interior surface of the tube and a retentate side located on an exterior surface of the oxygen transport membrane tube;

wherein the plurality of oxygen transport membrane panels are configured to separate oxygen from an oxygen containing stream contacting the retentate side of the oxygen transport membrane tubes in cross-flow arrangement and react the permeated oxygen with a gas stream containing hydrogen fuel or hydrocarbon fuel introduced into the permeate side of the oxygen transport membrane tubes thereby producing radiant heat and a reaction product stream;

wherein the plurality of steam generators are configured to produce steam from a source of feed water in the presence of the radiant heat from the oxygen transport membrane panels; and wherein the plurality of steam generators comprise a feed water, or feed steam manifold, a steam exhaust manifold, and a plurality of steam tubes disposed in a juxtaposed orientation with respect to the one or more the oxygen transport membrane tubes and the plurality of steam tubes in fluid communication with the feed water manifold and the steam collection manifold.

2. The oxygen transport membrane panel of claim 1 wherein said plurality of oxygen transport membrane repeating units are orientated within and supported by said panel frame.

3. The oxygen transport membrane panel of claim 2 wherein said plurality of oxygen transport membrane repeating units hang from said panel frame.

4. The oxygen transport membrane panel of claim 2 wherein the plurality of oxygen transport membrane tubes are arranged in a juxtaposed orientation.

5. The oxygen transport membrane panel of claim 4 wherein the plurality of oxygen transport membrane tubes are arranged in a serpentine orientation.

6. The oxygen transport membrane panel of claim 1 wherein the plurality of oxygen transport membrane tubes are arranged in a generally parallel orientation.

7. The oxygen transport membrane panel of claim 1 wherein the plurality of ceramic to ceramic coupling elements further comprise one or more ceramic linear connectors configured for fluidically coupling two adjacent oxygen transport membrane tubes in a linear orientation.

8. The oxygen transport membrane panel of claim 1 wherein the plurality of ceramic to ceramic coupling elements further comprise one or more ceramic U-shaped connectors configured for fluidically coupling two adjacent oxygen transport membrane tubes.

9. The oxygen transport membrane panel of claim 1 wherein the plurality of ceramic to ceramic coupling elements further comprise one or more ceramic M-shaped connectors configured for coupling three or more oxygen transport membrane tubes.

10. The oxygen transport membrane panel of claim 1 further comprising one or more isolation valve assemblies disposed between the first ceramic to metal coupling element and the feed manifold and/or between the second ceramic to metal coupling element and the exhaust manifold.

11. The oxygen transport membrane panel of claim 1 wherein said steam generators are configured to produce steam and/or supercritical steam from a source of feed water in the presence of the radiant heat from the oxygen transport membrane panels.

12. The oxygen transport membrane panel of claim 1 wherein each oxygen transport membrane tube is a composite material comprising a dense layer, a porous support and an intermediate porous layer located between the dense layer and the porous support, wherein said dense layer and the intermediate porous layer comprise a mixture of an ionic conductive material and an electrically conductive material effective in conducting oxygen ions and electrons.

13. An oxygen transport membrane array module comprising;

a frame assembly one or more oxygen transport membrane panels according to claim 1 supported by said frame assembly, each panel comprising a plurality of oxygen transport membrane repeating units arranged in a tightly packed linear or co-planar orientation wherein each oxygen transport membrane repeating unit contains two or more oxygen transport membrane tubes coupled together at one end to form a multi-pass arrangement and the other end of the tubes configured to be in fluid communication with a fuel feed manifold and an exhaust manifold; and one or more steam generators, disposed in a juxtaposed orientation with respect to the one or more the oxygen transport membrane panels, wherein each steam generator comprises a plurality of steam tubes in fluid communication with a feed water manifold and a steam collection manifold.

14. The oxygen transport membrane array module of claim 13 wherein said plurality of steam tubes are arranged in an array separate and juxtaposed from the oxygen transport membrane panels.

15. An oxygen transport membrane based steam generating reactor for producing steam, said reactor comprising one or more oxygen transport membrane array modules in accordance with claim 13.

16. The oxygen transport membrane based reactor of claim 15 wherein said one or more oxygen transport membrane array modules are housed in an insulated hot-air duct adjacent to a common feed water or feed steam drum arranged in a cooler zone and a common steam manifold or drum arranged in a separate zone apart from said cooler zone.

17. An oxygen transport membrane panel for transferring radiant heat to a process gas heater, the oxygen transport membrane panel comprising:

a panel frame; and a plurality of oxygen transport membrane repeating units arranged in a tightly packed linear and co-planar orientation;

wherein each oxygen transport membrane repeating unit comprises two or more oxygen transport membrane tubes coupled together at one end to form a multi-pass arrangement and the other end of the tubes configured to be in fluid communication with either a feed manifold or an exhaust manifold;

wherein each oxygen transport membrane tube having a permeate side located on an interior surface of the tube and a retentate side located on an exterior surface of the oxygen transport membrane tube;

wherein the plurality of oxygen transport membrane panels are configured to separate oxygen from an oxygen containing stream contacting the retentate side of the oxygen transport membrane tubes in cross-flow arrangement and react the permeated oxygen with a gas stream containing hydrogen fuel or hydrocarbon fuel introduced into the permeate side of the oxygen transport membrane tubes thereby producing radiant heat and a reaction product stream;

wherein said plurality of process gas heaters are configured receive radiant heat from the oxygen transport membrane panels; and wherein the plurality of process gas heaters comprise a feed manifold, an exhaust manifold, and a plurality of process gas tubes disposed in a juxtaposed orientation with respect to the one or more the oxygen transport membrane tubes and the plurality of gas tubes in fluid communication with the feed manifold and the gas exhaust manifold.

18. An oxygen transport membrane array module comprising; a frame assembly one or more oxygen transport membrane panels according to claim 17 oriented within said frame assembly, each panel comprising a plurality of oxygen transport membrane repeating units arranged in a tightly packed linear or co-planar orientation wherein each oxygen transport membrane repeating unit contains two or more oxygen transport membrane tubes coupled together at one end to form a multi-pass arrangement and the other end of the tubes configured to be in fluid communication with a fuel feed manifold and an exhaust manifold; and the one or more process gas heaters, disposed in a juxtaposed orientation with respect to the one or more the oxygen transport membrane panels, wherein each process gas heater comprises a plurality of process gas tubes in fluid communication with a feed manifold and a gas collection manifold.

19. The oxygen transport membrane array module of claim 18 wherein said plurality of gas tubes are orientated within a separate panel.

* * * * *